United States Patent
Gutierrez et al.

(10) Patent No.: US 10,795,618 B2
(45) Date of Patent: Oct. 6, 2020

(54) METHODS, APPARATUSES, AND SYSTEMS FOR VERIFYING PRINTED IMAGE AND IMPROVING PRINT QUALITY

(71) Applicant: Datamax-O'Neil Corporation, Altamonte Springs, FL (US)

(72) Inventors: Jose Fernando Sanchez Gutierrez, Orlando, FL (US); Ronald Schwallie, Lake Mary, FL (US); Thomas Axel Jonas Celinder, Singapore (SG); H Sprague Ackley, Seattle, WA (US)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 0 days.

(21) Appl. No.: 16/240,067

(22) Filed: Jan. 4, 2019

(65) Prior Publication Data
US 2019/0212955 A1 Jul. 11, 2019

Related U.S. Application Data

(60) Provisional application No. 62/614,089, filed on Jan. 5, 2018.

(51) Int. Cl.
*G06F 3/12* (2006.01)
*G06K 19/06* (2006.01)
(Continued)

(52) U.S. Cl.
CPC .......... *G06F 3/1208* (2013.01); *G06F 3/1243* (2013.01); *G06F 3/1284* (2013.01);
(Continued)

(58) Field of Classification Search
None
See application file for complete search history.

(56) References Cited

U.S. PATENT DOCUMENTS 5,051,567 A 9/1991 Tedesco
5,218,190 A 6/1993 Hardesty et al.
(Continued)

FOREIGN PATENT DOCUMENTS

EP 2270746 1/2011
EP 3336770 6/2018
(Continued)

OTHER PUBLICATIONS

US 8,548,242 B1, 10/2013, Longacre (withdrawn)
(Continued)

*Primary Examiner* — Benny Q Tieu
*Assistant Examiner* — Haris Sabah
(74) *Attorney, Agent, or Firm* — Alston & Bird LLP

(57) ABSTRACT

A method for evaluating a print quality of a printed document that is printed by a printer is provided. The printer comprises a pre-print image scanner, a post-print image scanner, and a printhead disposed between the pre-print image scanner and the post-print image scanner. The method comprises generating a pre-printing image of a print media, generating the printed document, generating a post-printing image of the printed document, generating a validation image by comparing the post-printing image with the pre-printing image, and comparing the validation image with the source image.

19 Claims, 19 Drawing Sheets

(51) Int. Cl.
*G06K 15/02* (2006.01)
*H04N 5/262* (2006.01)
*H04N 1/00* (2006.01)

(52) U.S. Cl.
CPC ....... *G06K 15/027* (2013.01); *G06K 15/1822* (2013.01); *G06K 15/1885* (2013.01); *G06K 19/06028* (2013.01); *G06F 3/1265* (2013.01); *H04N 1/00456* (2013.01); *H04N 5/2628* (2013.01)

(56) References Cited

U.S. PATENT DOCUMENTS

| | | | |
|---|---|---|---|
| 5,272,322 A | 12/1993 | Nishida et al. | |
| 5,488,223 A | 1/1996 | Austin et al. | |
| 5,488,233 A | 1/1996 | Ishikawa et al. | |
| 5,564,841 A | 10/1996 | Austin et al. | |
| 5,761,336 A | 6/1998 | Xu et al. | |
| 5,914,474 A | 6/1999 | Spitz | |
| 6,036,091 A | 3/2000 | Spitz | |
| 6,323,949 B1 | 11/2001 | Lading et al. | |
| 6,511,141 B1 | 1/2003 | Hasegawa et al. | |
| 6,535,299 B1 | 3/2003 | Scherz | |
| 6,567,530 B1 | 5/2003 | Keronen et al. | |
| 6,741,727 B1 | 5/2004 | Hirasawa | |
| 6,832,725 B2 | 12/2004 | Gardiner et al. | |
| 6,997,627 B2 | 2/2006 | Chiu | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,440,123 B2 | 10/2008 | Chodagiri et al. | |
| 7,471,331 B2 | 12/2008 | Kaneda | |
| 7,570,788 B2 | 8/2009 | Tsukamoto et al. | |
| 7,600,687 B2 | 10/2009 | Biss et al. | |
| 7,726,575 B2 | 6/2010 | Wang et al. | |
| 7,877,004 B2 | 1/2011 | Maruyama et al. | |
| 7,920,283 B2 | 4/2011 | Shimazaki | |
| 8,269,836 B2 | 9/2012 | Zandifar et al. | |
| 8,294,945 B2 | 10/2012 | Natori | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,482,809 B2 | 7/2013 | Mikami | |
| 8,488,181 B2 | 7/2013 | Wu et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein, Jr. | |
| 8,561,905 B2 | 10/2013 | Edmonds et al. | |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,675,266 B2 | 3/2014 | Watts |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,914 B2 | 5/2014 | French |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,768,102 B1 | 7/2014 | Ng et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |

(56) References Cited

U.S. PATENT DOCUMENTS

| | | |
|---|---|---|
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,085 B2 | 11/2014 | Vandemark et al. |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,037 B1 | 5/2015 | Rudin et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,053,055 B2 | 6/2015 | Caballero |
| 9,053,378 B1 | 6/2015 | Hou et al. |
| 9,053,380 B2 | 6/2015 | Xian et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,171,539 B2 | 10/2015 | Funyak et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,662 B2 | 2/2016 | Chen et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,367,722 B2 | 6/2016 | Xian et al. |
| 9,373,018 B2 | 6/2016 | Colavito et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,412,242 B2 | 8/2016 | Van et al. |
| 9,418,252 B2 | 8/2016 | Nahill et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,478,113 B2 | 10/2016 | Xie et al. |
| D771,631 S | 11/2016 | Fitch et al. |
| 9,507,974 B1 | 11/2016 | Todeschini |
| D777,166 S | 1/2017 | Bidwell et al. |
| 9,557,166 B2 | 1/2017 | Thuries et al. |
| 9,564,035 B2 | 2/2017 | Ackley et al. |
| 9,569,837 B2 | 2/2017 | Madden et al. |
| 9,582,696 B2 | 2/2017 | Barber et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,641,700 B2 | 5/2017 | Schumann et al. |
| 9,646,200 B2 | 5/2017 | Archibald et al. |
| 9,659,183 B2 | 5/2017 | Zhu et al. |
| 9,659,670 B2 | 5/2017 | Choi et al. |
| 9,665,757 B2 | 5/2017 | Feng et al. |
| D790,505 S | 6/2017 | Vargo et al. |
| D790,546 S | 6/2017 | Zhou et al. |
| D790,553 S | 6/2017 | Fitch et al. |

(56) References Cited

U.S. PATENT DOCUMENTS

| | | |
|---|---|---|
| 9,712,758 B2 | 7/2017 | Noda |
| 9,715,614 B2 | 7/2017 | Todeschini et al. |
| 9,734,493 B2 | 8/2017 | Gomez et al. |
| 9,752,864 B2 | 9/2017 | Laffargue et al. |
| 9,762,793 B2 | 9/2017 | Ackley et al. |
| 9,767,581 B2 | 9/2017 | Todeschini |
| 9,786,101 B2 | 10/2017 | Ackley |
| 9,794,392 B2 | 10/2017 | Hejl |
| 9,823,059 B2 | 11/2017 | Li et al. |
| 9,852,102 B2 | 12/2017 | Kohtz et al. |
| 9,857,167 B2 | 1/2018 | Jovanovski et al. |
| 9,861,182 B2 | 1/2018 | Oberpriller et al. |
| 9,891,612 B2 | 2/2018 | Charpentier et al. |
| 9,892,876 B2 | 2/2018 | Bandringa |
| 9,897,434 B2 | 2/2018 | Ackley et al. |
| 9,898,814 B2 | 2/2018 | Kitai et al. |
| 9,924,006 B2 | 3/2018 | Schoon et al. |
| 9,930,050 B2 | 3/2018 | Yeakley et al. |
| 9,954,871 B2 | 4/2018 | Hussey et al. |
| 9,978,088 B2 | 5/2018 | Pape |
| 9,984,685 B2 | 5/2018 | Braho et al. |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini et al. |
| 10,060,729 B2 | 8/2018 | Laffargue et al. |
| 10,066,982 B2 | 9/2018 | Ackley et al. |
| 10,121,466 B2 | 11/2018 | Pecorari |
| 10,139,495 B2 | 11/2018 | Payne |
| 10,195,880 B2 | 2/2019 | D'Armancourt |
| 10,269,342 B2 | 4/2019 | Braho et al. |
| 10,427,424 B2 | 10/2019 | Creencia et al. |
| 10,628,723 B2 | 4/2020 | D'Armancourt et al. |
| 10,672,588 B1 | 6/2020 | Pathangi et al. |
| 2001/0016054 A1 | 8/2001 | Banker et al. |
| 2001/0035971 A1* | 11/2001 | Koakutsu ............ G06K 1/121 358/1.13 |
| 2004/0029068 A1 | 2/2004 | Sachdeva et al. |
| 2004/0033098 A1 | 2/2004 | Chiu |
| 2004/0036089 A1 | 2/2004 | Chen |
| 2004/0120569 A1 | 6/2004 | Hung et al. |
| 2005/0105104 A1* | 5/2005 | Sakai ............... B41J 3/4075 358/1.1 |
| 2006/0039690 A1 | 2/2006 | Steinberg et al. |
| 2007/0146755 A1 | 6/2007 | Mindler et al. |
| 2007/0195337 A1* | 8/2007 | Takayama ........... B41J 3/4075 358/1.2 |
| 2008/0185432 A1 | 8/2008 | Caballero et al. |
| 2009/0058348 A1 | 3/2009 | Ryu |
| 2009/0087022 A1 | 4/2009 | Fukuda et al. |
| 2009/0134221 A1 | 5/2009 | Zhu et al. |
| 2009/0316161 A1* | 12/2009 | Yamaguchi ......... H04N 1/0044 358/1.2 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0188714 A1 | 7/2010 | Yamakawa |
| 2010/0265880 A1 | 10/2010 | Rautiola et al. |
| 2011/0102850 A1 | 5/2011 | Watanabe |
| 2011/0202554 A1 | 8/2011 | Powilleit et al. |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0182374 A1 | 7/2012 | Matsuda et al. |
| 2012/0182571 A1 | 7/2012 | Wu et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2012/0263483 A1 | 10/2012 | Suzuki |
| 2012/0330447 A1 | 12/2012 | Gerlach et al. |
| 2013/0038670 A1 | 2/2013 | Chen |
| 2013/0043312 A1 | 2/2013 | Van Horn |
| 2013/0082104 A1 | 4/2013 | Kearney et al. |
| 2013/0148987 A1 | 6/2013 | Arakawa |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0259301 A1 | 10/2013 | Chen et al. |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002842 A1 | 1/2014 | Ito |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078345 A1 | 3/2014 | Showering |
| 2014/0079292 A1 | 3/2014 | Kaneko et al. |
| 2014/0097249 A1 | 4/2014 | Gomez et al. |
| 2014/0098792 A1 | 4/2014 | Wang et al. |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166759 A1 | 6/2014 | Liu et al. |
| 2014/0168709 A1 | 6/2014 | Tokumaru |
| 2014/0168787 A1 | 6/2014 | Wang et al. |
| 2014/0175165 A1 | 6/2014 | Havens et al. |

(56) References Cited

U.S. PATENT DOCUMENTS

| | | |
|---|---|---|
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | Digregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0078627 A1 | 3/2015 | Fukase |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0193644 A1 | 7/2015 | Kearney et al. |
| 2015/0221077 A1 | 8/2015 | Kawabata et al. |
| 2015/0312780 A1 | 10/2015 | Wang et al. |
| 2015/0324623 A1 | 11/2015 | Powilleit |
| 2015/0327012 A1 | 11/2015 | Bian et al. |
| 2016/0042241 A1 | 2/2016 | Todeschini |
| 2016/0057230 A1 | 2/2016 | Todeschini et al. |
| 2016/0125217 A1 | 5/2016 | Todeschini |
| 2016/0125342 A1 | 5/2016 | Miller et al. |
| 2016/0178479 A1 | 6/2016 | Goldsmith |
| 2016/0189087 A1 | 6/2016 | Morton et al. |
| 2016/0255241 A1 | 9/2016 | Harashima et al. |
| 2016/0282807 A1 | 9/2016 | Kinoshita et al. |
| 2016/0292477 A1 | 10/2016 | Bidwell |
| 2016/0314276 A1 | 10/2016 | Wilz et al. |
| 2016/0314294 A1 | 10/2016 | Kubler et al. |
| 2016/0327614 A1 | 11/2016 | Young et al. |
| 2016/0343163 A1 | 11/2016 | Venkatesha et al. |
| 2016/0377414 A1 | 12/2016 | Thuries et al. |
| 2017/0060494 A1 | 3/2017 | Palmen et al. |
| 2017/0083734 A1 | 3/2017 | Henning et al. |
| 2017/0206643 A1 | 7/2017 | Weiss et al. |
| 2018/0131815 A1 | 5/2018 | Spivakovsky et al. |
| 2018/0198937 A1 | 7/2018 | Yoshizawa |
| 2018/0227463 A1 | 8/2018 | Fukase |
| 2018/0268534 A1 | 9/2018 | Kaneko |

FOREIGN PATENT DOCUMENTS

| | | |
|---|---|---|
| JP | 09-027049 A | 1/1997 |
| JP | 2002-281287 A | 9/2002 |
| JP | 4644283 B2 | 3/2011 |
| JP | 2011-110777 A | 6/2011 |
| JP | 2013-151126 A | 8/2013 |
| KR | 10-0767433 B1 | 10/2007 |
| WO | 2013/163789 | 11/2013 |
| WO | 2013/173985 | 11/2013 |
| WO | 2014/019130 | 2/2014 |
| WO | 2014/110495 | 7/2014 |

OTHER PUBLICATIONS

US 8,616,454 B2, 12/2013, Havens et al. (withdrawn)

Notice of Allowance for U.S. Appl. No. 16/240,109, dated Aug. 14, 2019, 10 pages.

Notice of Allowance for U.S. Appl. No. 16/240,140, dated Nov. 6, 2019, 9 pages.

"Detecting Barcodes in Images with Python and OpenCV" [online] [retrieved on May 27, 2019] Retrieved from the Internet: <https://www.pyimagesearch.com/2014/11/24/detecting-barcodes-images-python-opencv/> dated Nov. 24, 2014.

Anonymous: "How can I quantify difference between two images?—Stack Overflow", [online] [retrieved on May 27, 2019] Retrieved from the Internet:URL:https://stackoverflow.com/questions/189943/

(56) References Cited

OTHER PUBLICATIONS how-can-i-quantify-difference-between-two-images> dated Apr. 21, 2015, pp. 1-5.
Basic Image Enhancement and Analysis Techniques, 4 pages, [online], [retrieved on Oct. 3, 2016]. Retrieved from the Internet <URL:https://in.mathworks.com/help/images/image-enhancement-and-analysis.html>.
Extended European Search Report for European Application No. 19150493.5 dated May 24, 2019.
Extended European Search Report for European Application No. 19150494.3 dated Jun. 6, 2019.
Extended European Search Report for European Application No. 19150495.0 dated Jun. 4, 2019.
Faulty Barcode Detection, 11 pages, [online], [retrieved on Oct. 24, 2016]. Retrieved from the Internet <URL:http://tewson.com/sites/default/files/barcode.pdf>.
Find Image Rotation and Scale Using Automated Feature Matching, 7 pages, [online], [retrieved on Oct. 3, 2016]. Retrieved from the Internet <URL: hhttps://www.mathworks.com/examples/matlab-computer-vision/mw/vision_product-visionrecovertform-find-image-rotation-and-scale-using-automated-feature-matching>.
Image Analysis, 1 page, [online], [retrieved on Nov. 7, 2016]. Retrieved from the Internet <URL: http://in.mathworks.com/help/images/image-analysis.html>.
Image Enhancement, 1 page, [online], [retrieved on Oct. 3, 2016]. Retrieved from the Internet <URL: http://in.mathworks.com/help/images/image-enhancement-and-restoration.html>.
Imshowpair—compare differences between images, 6 pages, [online], [retrieved on Nov. 7, 2016]. Retrieved from the Internet <URL: http://in.mathworks.com/help/images/ref/imshowpair.html?requestedDomain=in.mathworks.com#bta3zrg>.
Non-Final Rejection dated Jul. 11, 2019 for U.S. Appl. No. 16/240,067.
Non-Final Rejection dated Jun. 26, 2019 for U.S. Appl. No. 16/240,140.
Non-Final Rejection dated May 2, 2019 for U.S. Appl. No. 16/240,109.
Notice of Allowance and Fees Due (PTOL-85) dated Jun. 12, 2019 for U.S. Appl. No. 16/240,109.
Office Action for U.S. Appl. No. 14/824,455 dated Nov. 30, 2018, 17 pages.
U.S. Appl. No. 13/367,978 for a Laser Scanning Module Employing an Elastomeric U-Hinge Based Laser Scanning Assembly, filed Feb. 7, 2012, Feng et al.
U.S. Appl. No. 14/277,337 for Multipurpose Optical Reader, filed May 14, 2014, Jovanovski et al.
U.S. Appl. No. 14/283,282 for Terminal Having Illumination and Focus Control filed May 21, 2014, Liu et al.
U.S. Appl. No. 14/446,391 for Multifunction Point of Sale Apparatus With Optical Signature Capture filed Jul. 30, 2014, Good et al.
U.S. Unpublished Patent Application for U.S. Appl. No. for 14/676,109.
Non-Final Rejection dated Mar. 12, 2020 for U.S. Appl. No. 16/240,140.
Notice of Allowance and Fees Due (PTOL-85) dated Jun. 2, 2020 for U.S. Appl. No. 16/240,295.
Corrected Notice of Allowability dated Aug. 7, 2020 for U.S. Appl. No. 16/240,140.
Corrected Notice of Allowability dated Jul 21, 2020 for U.S. Appl. No. 16/240,295.
Notice of Allowance and Fees Due (PTOL-85) dated Jul 28, 2020 for U.S. Appl. No. 16/240,140.

\* cited by examiner

METHODS, APPARATUSES, AND SYSTEMS FOR VERIFYING PRINTED IMAGE AND IMPROVING PRINT QUALITY

CROSS-REFERENCE TO RELATED APPLICATIONS

This non-provisional application claims the benefit of U.S. Provisional Patent Application No. 62/614,089, filed Jan. 5, 2018, the entire contents of which are incorporated herein by reference.

FIELD OF THE INVENTION

The present invention relates to printers, printing, and printed image verification. More particularly, the present method and apparatus provides robust printed image verification for improving image quality during printing operation.

BACKGROUND

Notwithstanding the revolution in digital communications and digital transmission/viewing of documents, hardcopy printed media—printing onto tangible sheets of paper or labels—remains essential for many purposes. Hardcopy printing may be accomplished via multiple types of devices, including thermal printers, inkjet printing, and laser printers. For all hardcopy media and printing methods, an important objective is a high level of visual clarity of the final printed output. When a document is intended for conventional, narrative text or images to be read/viewed by a person, visual clarity ensures the document is both readable and aesthetically appealing.

Applicant has identified many deficiencies and problems associated with existing printers. For example, existing printers do not provide accurate determination of print quality, and/or fail to improve the quality of printed images.

In addition, existing printers fail to provide proper print registration. "Proper print registration" means that the image occurs in the precise position as intended (an ideal position). Conversely, the image is not in register if any element of the image is misaligned or displaced, especially in reference to the edge of the print medium. Print registration errors can occur due to printer set-up and differences in print media. For example, the differences between printers and mechanical tolerances may cause the printed image not be aligned properly in the printhead direction (left to right) (i.e., the printed image may be horizontally offset such that an element (part of) the printed image is too close to the edge of or outside a print area of the print medium). During the printing process, the print media may also drift horizontally in the printhead direction (left and/or right). In these situations, there is a risk of the printed image being horizontally offset as compared to the ideal position, causing the printed image to no longer be machine-readable. The failed printed media needs to be reprinted, print media re-aligned, and/or printer configuration(s) changed before further printing, resulting in lost time and materials. Further, when printing barcodes, the printed barcode may include a distortion. The distortion may occur if a user uses an excessive thermal printhead temperature in an attempt to obtain better graphics and for other reasons. None of existing printers have been successful in reliably and consistently printing images that are in register.

BRIEF SUMMARY

Accordingly, in one aspect, the present system and method solves the problem by employing two scanners, which, in an embodiment, may both be within the printer itself. The scanners may employ 1D or 2D images sensors, such as charge-coupled device (CCD), a complementary metal-oxide-semiconductor (CMOS,) or a contact image sensor (CIS). A first scanner is configured to scan the print media as it is fed into the printer and detect any pre-printed matter. A second scanner is configured to scan the print media after the print operation. A hardware processor is configured to compare the second scan against the first scan to determine what the printhead or print roller (or similar print element) actually or effectively printed onto the paper.

In another aspect, the present system and method solves the problem via computer software which controls a hardware processor of the printer. Under software control, the hardware processor receives image data from a first scanner, which scans the print media as it is fed into the printer and detect any pre-printed matter. The hardware processor also receives image data from a second scanner, which scans the print media after the print operation. The suitably programmed hardware processor then compares the second scan against the first scan to determine what the printhead or print roller (or similar print element) actually or effectively printed onto the paper.

In another aspect, the present system and method solves the problem via a method employed on a processor-based system of a printer. The method employs the hardware processor to receive image data from a first scanner, which scans the print media as it is fed into the printer and detects any pre-printed matter. The method also employs the hardware processor to receive image data from a second scanner, which scans the print media after the print operation. The method then compares the second scan against the first scan, to determine what the printhead or print roller (or similar print element) actually or effectively printed onto the paper.

In accordance with various embodiments, a method for evaluating the print quality of a printed document is provided. The method comprises scanning, via a pre-print image scanner of said printer, a print media which is to be imprinted with said source digital image to generate a pre-printing image of said print media, wherein said pre-printing image comprises an image of any markings, banner or background pre-printed on said print media; printing on said print media, via a printhead of said printer, one or more new document elements based on the source image, yielding a printed document; scanning, via a post-print image scanner of said printer, the printed document to generate a post-printing image of said printed document; wherein: said post-printing image comprises: the image of the markings, banner or background pre-printed on said print media; and the one or more new document elements; generating, via said hardware processor, a validation image by subtracting said pre-printing image from said post-printing image.

In some embodiments, the method further comparing, via said hardware processor, the validation image with the source image, wherein said hardware processor identifies any differences between said validation image and said source image; and determining via said hardware processor, based on said differences, whether the printing on said print media of the source image resulted in a valid printed document or an invalid printed document.

In some embodiments, the method further comprises applying, via the hardware processor, to the differences between said validation image and said source image, a comparison criteria indicative of whether a printed document is valid or invalid.

In some embodiments, said comparison criteria defines a magnitude of the differences between the validation image and the source image.

In some embodiments, said comparison criteria distinguishes a valid printed document from an invalid printed document based on specifying a threshold value which separates an acceptable magnitude of differences from an unacceptable magnitude of differences.

In some embodiments, said magnitude of the differences comprises at least one of: a magnitude of a contrast between a newly printed document element and the markings, banner or background pre-printed on said printed document; a degree of displacement of the newly printed document element as compared with a placement of the corresponding element of said source image within the complete source image; and a degree of edge sharpness or edge blur of said newly printed document element as compared with a degree of edge sharpness or edge blur of the corresponding element of said source image.

In some embodiments, said comparison criteria identifies a type of the differences between the validation image and the source image.

In some embodiments, said comparison criteria distinguishes a valid printed document from an invalid printed document based on defining an acceptable type of differences versus an unacceptable type of differences.

In some embodiments, said type of differences of the comparison criteria comprises at least one of: a difference between a coded symbol of the source document and a corresponding coded symbol of the validation image; and a difference between an alphanumeric text of the source document and a corresponding alphanumeric text of the validation image.

In accordance with various embodiments, a method for evaluating the print quality of a printed document is provided. The method comprises obtaining at a hardware processor of the printer a raster source image of a source page to be printed, said source image comprising an intended print content; scanning, via a pre-print image scanner of said printer, a print media which is to be imprinted with said source digital image, wherein said printer generates a pre-printing image of said print media; printing on said print media, via a printhead of said printer, one or more new document elements based on the source image, yielding a printed document; scanning, via a post-print image scanner of said printer, the printed document, wherein said printer generates a post-printing image of said printed document, said post-printing image comprising the one or more new document elements; comparing, via said hardware processor, the pre-printing image, the post-printing image, and the source image, wherein said hardware processor identifies a difference between the one or more new document elements and the intended print content; and determining via said hardware processor, and based on said difference, whether the printing on said print media of the source image resulted in a valid printed document or an invalid printed document.

In some embodiments, comparing the pre-printing image, the post-printing image, and the source image comprises generating, via said hardware processor, a validation image which is generated by digitally subtracting said pre-printing image from said post-printing image. Said pre-printing image comprises an image of any element which was pre-printed on said print media. Said post-printing image comprises: the image of the any element pre-printed on said print media. Said one or more newly imprinted document elements comprise at least one of new alphanumeric text, new symbols, and new graphics. Said validation image comprises the newly imprinted document elements without the image of any pre-printed elements.

In some embodiments, identifying a difference between the one or more newly imprinted document elements and the intended print content comprises comparing, via said hardware processor, the validation image with the source image.

In some embodiments, the method further comprises applying, via the hardware processor, to the difference between said validation image and said source image, a comparison criteria indicative of whether a printed document is valid or invalid.

In some embodiments, said comparison criteria defines a magnitude of the difference between the validation image and the source image; and said comparison criteria further distinguishes a valid printed document from an invalid printed document based on specifying a threshold value which separates an acceptable magnitude of difference from an unacceptable magnitude of difference.

In some embodiments, said comparison criteria identifies a type of difference between the validation image and the source image. Said comparison criteria further distinguishes a valid printed document from an invalid printed document based on defining an acceptable type of difference versus an unacceptable type of difference.

In accordance with various embodiments, a method for evaluating the print quality of a printed document is provided. The method comprises obtaining at a hardware processor a source image of a source page to be printed; obtaining at the hardware processor a pre-print image comprising an image of a print media prior to printing, said pre-print image comprising any pre-printed elements on said print media; obtaining at the hardware processor a post-print image comprising an image of the printed document, said post-printing image comprising the pre-printed elements and one or more newly imprinted document elements; generating, via said hardware processor, a modified post-print image by subtracting the pre-print image from the post-print image.

In some embodiments, the method further comprises comparing, via said hardware processor, the modified post-printing image and the source image, wherein said hardware processor identifies a difference between the newly imprinted document elements and the source image; and determining via said hardware processor, and based on said difference, whether the printing on said print media of the source image resulted in a valid printed document or an invalid printed document.

In some embodiments, the method further comprises printing on said print media, after obtaining the pre-print image and before obtaining the post-print image, and via a printhead of a printer coupled with said hardware processor, the one or more new document elements based on the source image, yielding the printed document for post-scanning.

In some embodiments, the method further comprises obtaining said pre-print image from a first image scanner of said printer.

In some embodiments, the method further comprises obtaining said pre-print image from an image scanner external to said printer; and obtaining said post-print image from an image scanner external to said printer.

In some embodiments, the method further comprises obtaining both of said pre-print image and said post-print image from a single internal image scanner of said printer, wherein said print media is fed twice through said printer, first without printing and second with printing.

In some embodiments, the method further comprises applying, via the hardware processor, to the difference between said modified post-print image and said source image, a comparison criteria indicative of whether a printed document is valid or invalid, wherein said comparison criteria comprises at least one of: a magnitude of the difference between the validation image and the source image; and a type of difference between the validation image and the source image.

In some embodiments, the method further comprises at least one of: distinguishing a valid printed document from an invalid printed document based on an acceptable magnitude of difference versus an unacceptable magnitude of difference; and distinguishing a valid printed document from an invalid printed document based on an acceptable type of difference versus an unacceptable type of difference.

In accordance with various embodiments of the present invention, a method for printing an image on print media with a printer is provided. The method comprises receiving print data, at least part of the print data used to generate the image; receiving a reference image or generating the reference image from at least part of the print data; storing the reference image in a memory of the printer; printing the image to obtain a printed image; capturing a representation of the printed image to obtain a captured image; determining if the captured image conforms to the reference image by comparing at least a portion of the captured image with a same portion of the reference image; and modifying at least part of the print data used to generate the image prior to generating a succeeding image if the captured image does not conform to the reference image.

In some embodiments, the captured image comprises a barcode, and determining if the captured image conforms to the reference image comprises comparing the barcode of the captured image with a reference barcode in the reference image, wherein the captured image does not conform to the reference image if the barcode of the captured image includes a distortion not present in the reference barcode.

In some embodiments, modifying at least part of the print data comprises automatically adjusting the barcode in the print data used to generate the image for improving a print quality of the succeeding image comprising a printed barcode.

In some embodiments, automatically adjusting the barcode comprises at least one of removing a portion of and adding to each bar edge of the barcode in the print data used to generate the image, thereby maintaining overall dimensions in the printed barcode of the succeeding image.

In some embodiments, determining if the captured image conforms to the reference image comprises comparing a horizontal position of the printed image in the captured image with the horizontal position of the reference image, wherein the captured image does not conform to the reference image if there is an offset in the horizontal position of the printed image relative to the horizontal position of the reference image.

In some embodiments, the method further comprises prior to the modifying step, storing a value of the offset in the memory; and wherein modifying the print data used to generate the image results in modified print data and comprises shifting the print data used to generate the image by the value of the offset to reposition the succeeding image on the print media.

In some embodiments, shifting the print data used to generate the image comprises inserting or removing a margin in a left or right portion of the print data used to generate the image.

In some embodiments, the method further comprises, after shifting the print data used to generate the image: printing the succeeding image to obtain a succeeding printed image; capturing a succeeding representation of the succeeding printed image from the same printer to obtain a succeeding captured image; comparing the succeeding captured image with the reference image to determine if the succeeding captured image conforms to the reference image; and further shifting the modified print data used to generate the succeeding image if the succeeding captured image does not conform to the reference image, wherein the succeeding captured image does not conform to the reference image if there is an offset in the horizontal position of the succeeding printed image in the succeeding captured image relative to the horizontal position of the reference image.

In some embodiments, the printing, capturing, comparing, and further shifting steps are repeated until the succeeding printed image in the succeeding captured image conforms to the reference image.

In some embodiments, the method further comprises comparing the horizontal position of the succeeding printed image with the horizontal position of an immediately preceding printed image to determine if the print media is drifting during operation of the printer, wherein a difference in the horizontal position of the succeeding printed image relative to the horizontal position of the immediately preceding printed image comprises a drifting offset having a value; and further shifting the modified print data used to generate the succeeding image by the value of the drifting offset resulting in further modified print data before generating a next succeeding image using the further modified print data.

In some embodiments, the method further comprises shifting the print data by changing a user command.

In some embodiments, capturing the representation of the printed image comprises capturing the representation from at least one of: a first time use of the printer; a first time use of new print data; and a first time use of new print media stock.

In some embodiments, the method further comprises, prior to a first time use of the new print media stock, capturing a width of the new print media stock and shifting the print data based on the width to substantially center the succeeding image on a print medium.

In some embodiments, the captured image comprises a non-conforming captured image if the captured image does not conform to the reference image, the method further comprising: generating a notice about the non-conforming captured image to a user of the printer.

In some embodiments, generating the notice comprises prompting the user to adjust the print media guide of the printer.

In accordance with various embodiments, the present invention embraces a method for printing an image on print media with a printer. The method comprises receiving print data, at least part of the print data used to generate the image. A reference image is received or generated from at least part of the print data. The reference image is stored in a memory of the printer. The image is printed to obtain a printed image. A representation of the printed image is captured to obtain a captured image. At least a portion of the captured image is compared with a same portion of the reference image to determine if the captured image conforms to the reference image. At least part of the print data used to generate the image is modified prior to generating a succeeding image if the captured image does not conform to the reference image.

In accordance with various embodiments, the present invention embraces a method for printing an image on print media. The method comprises receiving print data, at least part of the print data used to generate the image. A reference image is received or generated from at least part of the print data and stored in a memory of a printer. The image is printed to obtain a printed image. A representation of the printed image is captured to obtain a captured image. The captured image is compared with the reference image to determine if a horizontal position of the printed image conforms to the horizontal position of the reference image, wherein the captured image comprises a non-conforming captured image if the horizontal position of the printed image in the captured image is offset from the horizontal position of the reference image, the offset having a value. The value of the offset is stored in a memory of the printer. The print data used to generate the image is shifted by the value of the offset to reposition a succeeding image on the print media.

In some embodiments, the image comprises a printed indicium. In some embodiments, shifting the print data used to generate the image comprises inserting or removing a margin in a left or right portion of the print data used to generate the image.

In accordance with various embodiments, the present invention embraces a method for improving print quality during operation of a printer. The method comprises printing a barcode on a print medium to obtain a printed barcode. The barcode is generated using print data. An image of the printed barcode is captured to obtain a captured image. The printed barcode in the captured image is compared with the reference barcode to determine if the printed barcode in the captured image conforms to the reference barcode of a reference image. The printed barcode does not conform to the reference barcode if a distortion exists in the printed barcode that is not present in the reference barcode. The print data used to generate the barcode is modified prior to generating a succeeding barcode if the printed barcode in the captured image does not conform to the reference barcode.

In some embodiments, modifying the print data used to generate the barcode comprises at least one of removing a portion of and adding to each bar edge of the barcode in the print data used to generate the barcode, thereby maintaining overall dimensions in the succeeding barcode.

The foregoing illustrative summary, as well as other exemplary objectives and/or advantages of the present invention, and the manner in which the same are accomplished, are further explained within the following detailed description and its accompanying drawings.

DETAILED DESCRIPTION OF THE INVENTION

Figure 1:
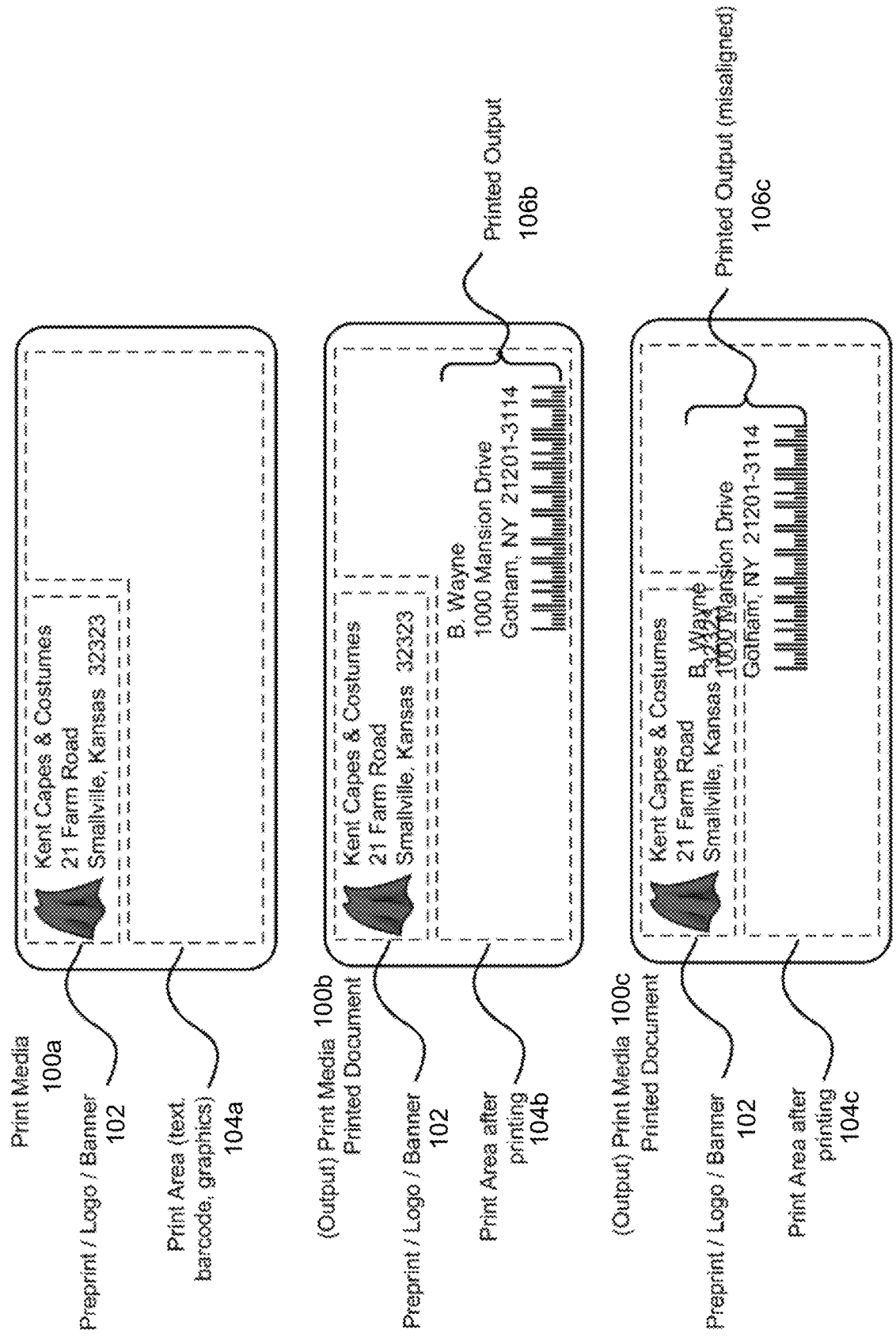
FIG. 1 illustrates several exemplary print media, according to various embodiments of the present invention.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein;

rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

Various embodiments of the present invention will be described in relation to a thermal transfer printer. However, the present invention may be equally applicable to other types and styles of printers (inclusive of printer-verifiers) (e.g., a thermal direct printer, a laser toner printer, an ink drop printer, etc.).

The headings provided herein are for convenience only and do not limit the scope or meaning of the claimed invention.

I. Definitions and Overview

Quality of printed document may be assessed to identify printing problems. For example, embodiments of the present invention may scan a printed document after the printing process is complete, and identify errors in the final output. Improvements on print registration may also be provided. For example, to globally address a print registration error that is affecting a plurality of printed medium, a printhead in the printer may be mechanically adjusted to be centered over the print medium, the timing may be adjusted, etc.

Various embodiments of the present invention provide system and method for a printer to compare the final output of a print operation with the initial, pre-printed contents of the print media that is fed to the printer. Such system and method can determine if the final output is not visually obscured by any initial, pre-printed contents of the fed print media. Various embodiments of the present invention provide methods for printing an image on print media and for improving print quality during printer operation. For example, the present invention controls horizontal print registration of an image on a print medium and prints barcodes without distortion.

The terms "print media," "physical print media," "paper," and "labels" refer to tangible, substantially durable physical material onto which text, graphics or images may be imprinted and persistently retained over time.

Physical print media are used for personal communications, business communications, to convey prose expression (including news, editorials, product data, academic writings, memos, and many other kinds of communications), data, advertising, fiction, entertainment content, and illustrations and pictures.

Physical print media are generally derivatives of wood pulp or polymers, and includes conventional office paper, clear or tinted acetate media, news print, envelopes, mailing labels, product labels, and other kinds of labels. Thicker materials, such as cardstock or cardboard may be included as well. More generally, print media is used to receive ink, dye, or toner, or is a media whose color or shading can be selectively varied (for example, through selective application of heat, light, or chemicals) to create a persistent visual contrast (in black and white, shades of gray, and/or colors) that can be perceived by the human eye as text, images, shapes, symbols, or graphics.

In exemplary embodiments discussed throughout this document, reference may be made specifically to "paper" or "labels;" however, the operations, system elements, and methods of such exemplary applications may be applicable to media other than or in addition to the specifically mentioned "paper" or "labels."

A "printer" is a device which imprints text, images, shapes, symbols, or graphics onto print media to create a persistent, human-readable representation of the text, images, shapes, symbols, or graphics. Printers may include, for example, laser printers, light-emitting diode (LED) printers, inkjet printers, thermal printers, dot matrix printers, impact printers, and line printers.

Generally, printers are designed so that one or more sheets of paper, one or more labels, or other print media can be inserted or "fed" into the printer. For example, multiple sheets or other media can be inserted into a holding tray or other container element of the printer for temporary storage. In alternative embodiments, individual sheets of print media may be hand-fed into a printer one at a time. Command and content instructions are then sent to the printer electronically, for example, from an external computer that is communicatively linked to the printer. The printer feeds a sheet of paper, or a label, or other print media into itself and towards a printhead within the printer. The printhead of the printer then imprint the appropriate contents onto the print media.

Figure 2A:
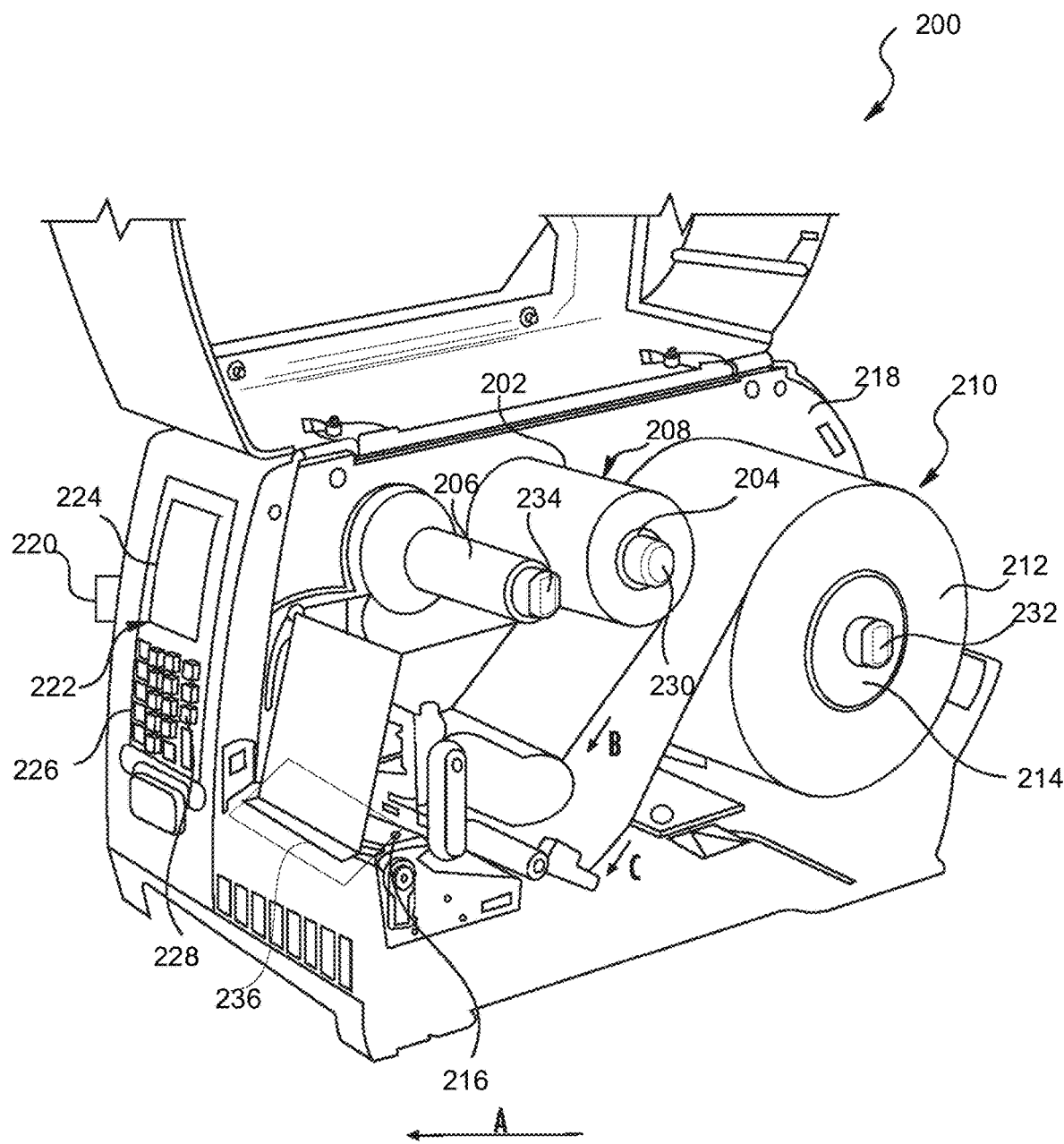
FIG. 2A graphically illustrates a portion of an exemplary printer-verifier (a cover of the printer-verifier removed) to illustrate an interior thereof, according to various embodiments of the present invention.
Figure 2B:
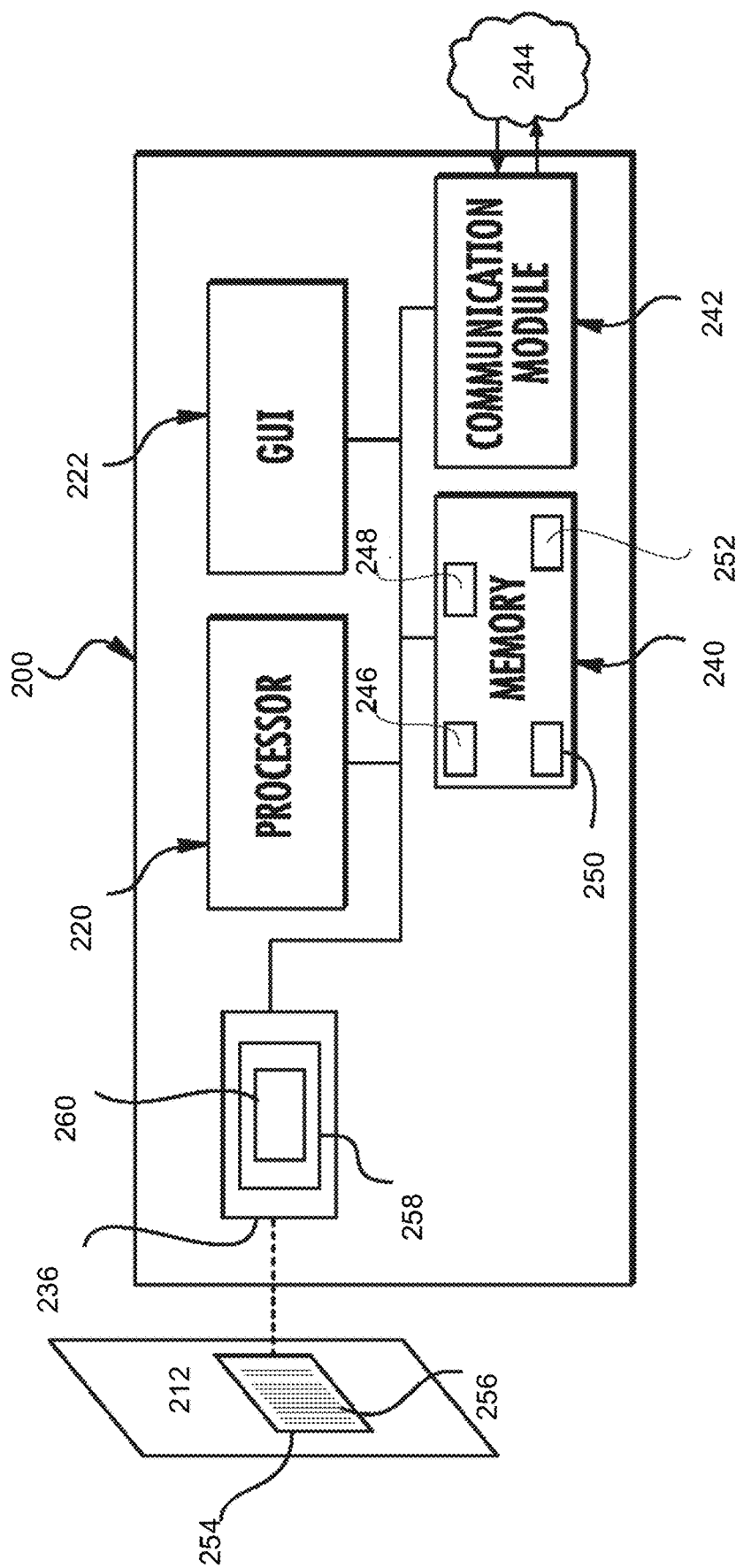
FIG. 2B schematically depicts a block diagram of the printer-verifier of FIG. 2A, according to various embodiments of the present invention.
Figure 3:
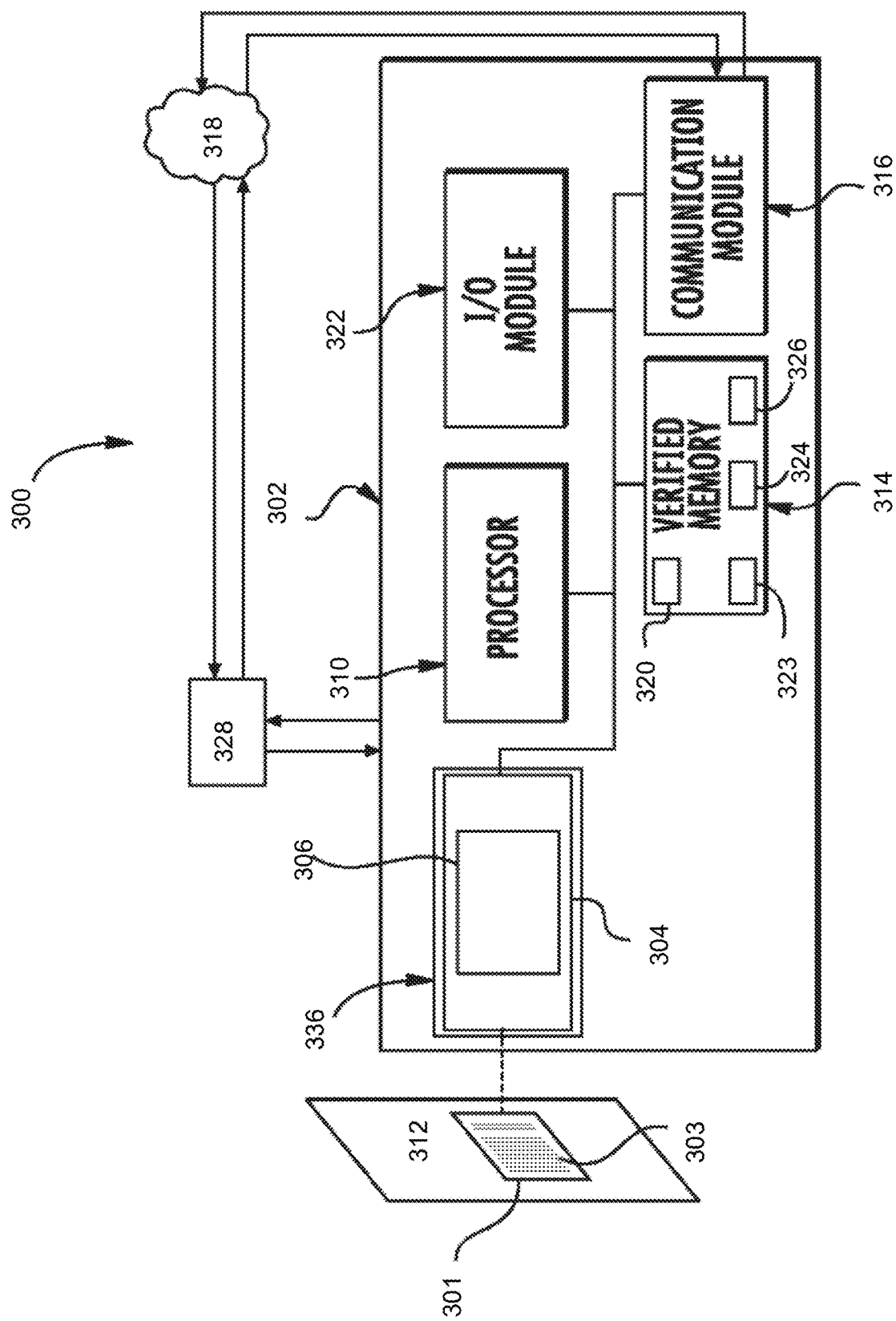
FIG. 3 schematically depicts an exemplary printer communicatively coupled to a verifier in a system for printing an image and verifying a print quality of the image, according to various embodiments of the present invention.

Further, the term "printer" refers to both a printer-verifier (in which a printer and verifier are integrated in a single device) such as exemplified in FIGS. 2A-2B and a separate printer as exemplified in FIG. 3. As depicted in FIG. 3, and hereinafter described, the separate printer 328 may be communicatively coupled to a verifier 302 in a system 300 for printing an image and verifying a print quality of the image. The verifier 302 may be attached to the printer 328 or may be a standalone device to where the user brings the printed image from the printer for verifying the print quality of the image printed on the print medium.

As depicted in FIGS. 2A-2B, printer-verifier 200 is configured for both printing the image and verifying a print quality of the image printed on print medium, as hereinafter described. Printer-verifier 200 is configured for printing the image and a verifier within the printer-verifier 200 is configured for verifying the print quality of the image printed on print medium. As used herein, the "image" may be text, a line, a box, a symbol, a barcode, optical character recognition (OCR) text, etc.

The term "utility documents" refers to documents used for labeling and routing of other documents or objects. For example, utility documents may include mailing labels; document covers; product, container or document identification labels; and bar codes or matrix codes which are printed onto labels, with the labels then being attached to other materials. If the text or the geometric symbologies on utility documents are blurred or incomplete, or are misaligned and possibly obscured by previously printed matter (for example, by pre-preprinted return addresses), items may fail to be properly routed, transmitted, or stored.

In some instances, the print media which may be intended for printing is a completely blank print media, such as a blank sheet of paper or a blank label. Often, the sheet of paper or the label may be of uniform color (for example, plain white) with no other colors or markings on the page, although print media may have colors or textures.

In some instances, the print media (for example, paper or labels), when first fed or loaded into the printer, has at least one pre-printed document element such as preprinted text, markings, or logos. In other words, prior to a current print operation, there can be prior information on the print media that has been imprinted by some prior print process employing a prior printer, and is referred to as containing "pre-printed document element" or "pre-printed content."

A common example is letterhead stationary, which is a sheet of paper that contains (often at the top) a personal or company name and other pertinent information, such as an address, phone number, e-mail addresses, etc. Another example is mailing label which may have a standardized or uniform return mailing address. Another example is product label with product identification and other information. Corporate and organization logos are often pre-printed as well, along with borders or similar ornamentation. If the printed document is only scanned after printing, the print-analysis software or module has no basis to distinguish the new content which was created by the printer from the pre-printing image.

In addition to, or in alternative to pre-printed document elements, some print media come from the manufacturer with a background and/or a border. Such a background may for example be a uniform color (other than white), a texture (for example, wood grains or marble grains, or other textures), or an ornamental border. Background colors, textures, and borders are referred to herein (including in the appended claims) as a "background."

As described above, media which is used or designated to be used for printing, and which includes pre-printed content (logos, banners, etc.) is referred to as "pre-printed media," or equivalently, as "pre-printed labels" or "pre-printed paper."

In some instances, when a printer is used to print on pre-printed media, it is usually desirable to not print the new text or graphics on top of the pre-print content. This is because the pre-print banner or logo may obscure the new content, and similarly the new content may obscure the pre-printed content. As such, areas or sections of the print media (such as paper or labels) which do not contain pre-printed content are considered most suitable for printing. Such area(s) may be referred to as the "print area" of the print media. (Other considerations may apply to designating print area(s) as well; for example, it may be desirable to maintain printed text or graphics as being at least a designated, minimum distance from the media margins, such as ½ inch or one inch from the margins.).

As described further below, the present invention embraces methods for printing an image on print media and improving print quality during printer operation. Various embodiments enable correct horizontal positioning of a printed image on a print medium. The term "correct horizontal positioning" means that the printed image is automatically and consistently printed as intended, such as within the boundaries of a print area of the print medium or at the center of the print medium, etc., depending on preference. Various embodiments enable positioning the image to be printed properly with regard to the horizontal edges of the print medium, such that the printing is reliably and consistently in horizontal register. Various embodiments enable the horizontal position to be fixed automatically for each print medium in real-time without user interaction.

As used herein, "horizontal position" refers to the weft direction perpendicular to the movement of the print media and parallel to the printhead. As used herein, the term "further shifting" means a shifting/movement relative to an original position. Various embodiments also enable printing barcodes without distortion while retaining better graphics intended by the user, as hereinafter described.

FIG. 1 illustrates some elements of an exemplary sheet of a pre-printed print media $100a$, such as a pre-printed label, paper, or envelope, which may be fed into a printer. The pre-printed (or unprinted) print media $100a$ may include only the pre-printed text/logo/banner $102$. Pre-print text/logo/banner $102$ may include at least one pre-printed document element such as text (in any known alphabet), numbers, mathematical or musical symbols, geometric forms, shapes, and symbols, and icons. For brevity below, such pre-printed data is referred to as preprint $102$, text $102$, logo $102$, or banner $102$.

Most of the remaining area of the print media $100a$ is typically designated for use for printing one or more new document elements, and may be referred to as print area $104a$. In this regard, some space on print media $100a$ may be intended for use for page/label margins or to leave some "white space" around text/logo/banner $102$, and is therefore not intended for printing. Print media $100a$ has not yet been run through a current print operation, so print area $104a$ is currently blank (empty).

Printed document $100b$ (also referred to herein as "printed media $100b$") is produced from the print media $100a$ (or an identical media), and the printed media $100b$ has been run through a printer, with resulting printed output $106b$. The printed output $106b$ is within the media's print area $104b$.

However, error may occur in printing the printed media/document. Print media $100c$ (also referred to herein as "printed document $100c$") is produced from a print media as print media $100a$, and the print media has been run through a printer, with resulting printed output $106c$. In this instance, it is visually apparent that a printing error occurred: the printed output $106c$ is partly outside of the print area $104c$, and partly overlaps with preprint text/logo/banner $102$. The result is that both the printed output $106c$ and the preprint text/logo/banner $102$ are partly obscured by each other, rending them difficult to read and likely invalid. Various embodiments of the present invention detect and correct such print errors.

II. Example Apparatus for Implementing Embodiments of the Present Invention

Embodiments of the present invention may be implemented as apparatus and systems for verifying printed image and improving print quality.

The present system and method is applicable to different kinds of printers, including but not limited to laser printers, LED printers, inkjet printers, thermal printers, dot matrix printers, and others. For convenience, an exemplary laser printer is illustrated and discussed in some exemplary embodiments below, and these embodiments can be employed on other kinds of printers as well.

A. Printer and Printer with Verifier/Scanner

Referring now to FIGS. 2A-2B, an exemplary printer-verifier 200 capable of printing on print media 212 is partially shown. The depicted printer-verifier 200 of FIG. 2A has a body 218 for enclosing an interior thereof. The printer-verifier 200 further comprises a power source and a moveable cover for accessing the interior and any components therein.

In various embodiments, the printer-verifier 200 is a thermal transfer printer-verifier that includes a ribbon supply spindle 230 contained within the body 218. A ribbon supply roll 208 is configured to be disposed on the ribbon supply spindle 230. The ribbon supply roll 208 comprises ink ribbon 202 wound on a ribbon supply spool 204. The ink ribbon supplies the media (e.g., ink) that transfers onto the print media. The printer-verifier 200 may further comprise a thermal printhead 216 utilized to thermally transfer a portion of ink from the ink ribbon 202 to the print media 212 as the ink ribbon is unwound from the ribbon supply spool 204 along a ribbon path (arrow B in FIG. 2A), and the print media 212 is unwound from a media supply spool 214 along a media path (arrow C in FIG. 2A).

A media supply roll 210 comprises the print media 212 wound on the media supply spool 214. A media supply spindle 232 on which the media supply roll 210 is configured to be disposed is contained within the body 218. A ribbon rewind spindle 234 on which unwound ribbon is wound up may also be contained within the body 218. A ribbon take-up 206 may be disposed on the ribbon rewind spindle 234, although the ribbon take-up 206 on the ribbon rewind spindle 234 may not be necessary.

The printer-verifier 200 may further comprise one or more motors for rotating the ribbon supply spindle 230 and the ribbon supply roll 208 disposed thereon (if present) in a forward (arrow A in FIG. 2A) or a backward rotational direction (dependent on the ink surface), for rotating the media supply roll 210 disposed on the media supply spindle 232 in a forward rotational direction, and for rotating the ribbon rewind spindle 234. In a thermal direct printer-verifier, the ribbon supply spool, the ribbon rewind spool, and the ribbon may be eliminated and a thermally sensitive paper replaces the print media. These components are also included in a printer-verifier 200 as hereinafter described.

The printer-verifier 200 may include a GUI 222 for communication between a user and the printer-verifier 200. The GUI 222 may be communicatively coupled to the other components of the printer-verifier for displaying visual and/or auditory information and receiving information from the user (e.g., typed, touched, spoken, etc.). As depicted in FIG. 2A, the body 218 of the printer-verifier 200 may include the GUI 222 with, for example, a display 224 and a keypad 226 with function buttons 228 that may be configured to perform various typical printing functions (e.g., cancel print job, advance print media, and the like) or be programmable for the execution of macros containing preset printing parameters for a particular type of print media. The graphical user interface (GUI) 222 may be supplemented or replaced by other forms of data entry or printer control, such as a separate data entry and control module linked wirelessly or by a data cable operationally coupled to a computer, a router, or the like. The GUI 222 may be operationally/communicatively coupled to a processor (CPU) 220 for controlling the operation of the printer-verifier 200, in addition to other functions. In some embodiments, the user interface may be different from the one depicted in FIG. 2A. In some embodiments, there may not be a user interface.

Referring now to FIG. 2B, an example block diagram of the printer-verifier 200 is shown. The printer-verifier 200 may comprise the processor 220, a memory 240 communicatively coupled to the processor 220, and a power source. The printer may further comprise a communications module 242 communicatively coupled to one or more of the other printer components.

The central processing unit (CPU) (i.e., the processor 220) is the electronic circuitry within a computer that carries out the instructions of a computer program by performing the basic arithmetic, logical, control and input/output (I/O) operations specified by the instructions as hereinafter described. The printer-verifier 200 may be communicatively connected using the communications module 242 to a computer or a network 244 via a wired or wireless data link. In a wireless configuration, the communications module 242 may communicate with a host device over the network 244 via a variety of communication protocols (e.g., WI-FI®, BLUETOOTH®), CDMA, TDMA, or GSM). In accordance with various embodiments of the present invention, the memory 240 is configured to store a print quality verification program 246, a reference image 248, an offset value 250, and a drifting offset value 252 as hereinafter described.

Still referring to FIGS. 2A and 2B, an imaging module 236 is disposed in the printer-verifier 200 and is configured to capture a representation of the printed image (e.g., printed barcode 254 on print medium 212 within a field of view 256), using an image sensor 258 (i.e., the imaging module 236 comprises the image sensor 258) to obtain a captured image. The image sensor 258 comprises a light source 260 for illuminating the field of view. The image sensor 258 uses an imaging lens (or lenses) to form a real image of the field of view 256 on an array of photo sensors (e.g., a linear or 2D array CCD, CMOS sensor, etc.). Electronic signals from the photo sensors are used to create gray level or color images, which would result in a digital image similar to that which may be obtained by a digital camera.

The processor 220 is further configured to determine if the captured image conforms to the reference image 248 by comparing at least a portion of the captured image with a same portion of the reference image. As described further below, determining if the captured image conforms to the reference image comprises comparing a horizontal position of the printed image in the captured image with the horizontal position of the reference image, wherein the captured image does not conform to the reference image if there is an offset in the horizontal position of the printed image relative to the horizontal position of the reference image.

As described further below, if the captured image comprises a barcode, determining if the captured image conforms to the reference image comprises comparing the barcode of the captured image with a reference barcode in the reference image, wherein the captured image does not conform to the reference image if the barcode of the captured image includes a distortion not present in the reference barcode.

Referring now to FIG. 3, an example printer 328 communicatively coupled to verifier 302 in system 300 for printing an image and verifying a print quality of the image is shown. Printer 328 may be similar to the printer-verifier 200 depicted in FIGS. 2A-2B, except that the imaging module of the verifier is separated from the printer in system 300. In this regard, printer 328 has a body for enclosing an interior thereof. The printer 328 further comprises a power source and a moveable cover for accessing the interior. Similar to the printer-verifier 200 described above in connection with FIGS. 2A-2B, the printer 328 may comprise a ribbon supply spindle contained within the body. A ribbon supply roll is configured to be disposed on the ribbon supply spindle. The ribbon supply roll ink ribbon wound on a ribbon supply spool. The ink ribbon supplies the media (e.g., ink) that transfers onto the print media.

Similar to the printer-verifier 200 described above in connection with FIGS. 2A-2B, the printer 328 may further comprise a thermal printhead utilized to thermally transfer a portion of ink from the ink ribbon to the print media, as the ink ribbon unwinding from the ribbon supply spool along a ribbon path and the print media unwinding from a media supply spool along a media path. A media supply roll comprises the print media wound on the media supply spool. A media supply spindle (on which the media supply roll is configured to be disposed) is contained within the body. A ribbon rewind spindle on which unwound ribbon is wound up may also be contained within the body. A ribbon take-up may be disposed on the ribbon rewind spindle, although the ribbon take-up on the ribbon rewind spindle may not be necessary.

The printer 328 may further comprise one or more motors for rotating the ribbon supply spindle and the ribbon supply roll disposed thereon (if present) in a forward or a backward rotational direction (dependent on the ink surface), for rotating the media supply roll disposed on the media supply spindle in a forward rotational direction, and for rotating the ribbon rewind spindle. In a direct transfer printer-verifier, the ribbon supply spool, the ribbon rewind spool, and the ribbon may be eliminated and a thermally sensitive paper substituted for the print media.

Similar to the printer-verifier 200 described above in connection with FIGS. 2A-2B, the printer 328 may further comprise a processor, a memory communicatively coupled to the processor, and a power source. The printer may further comprise a communications module communicatively coupled to one or more of the other printer components. The printer 328 may have a fewer or greater number of components as hereinafter described.

The verifier 302 comprises imaging module 336, a memory (a verifier memory 314) communicatively coupled to the imaging module 336 and a central processing unit (CPU) (herein a "verifier processor" 310) communicatively coupled to the verifier memory 314 and imaging module 336. The verifier 302 may further comprise an I/O module 322 and a verifier communication module 316.

The subsystems in the verifier 302 of FIG. 3 are electrically connected via a coupler (e.g., wires, traces, etc.) to form an interconnection subsystem. The interconnection system may include power buses or lines, data buses, instruction buses, address buses, etc., that allow operation of the modules/subsystems and the interaction there between. The I/O module 322 may include a verifier graphical user interface. In various embodiments, the verifier 302 may be communicatively connected using the verifier communication module 316 to the computer or the network 318 via a wired or wireless data link. In a wireless configuration for the wireless data link, the verifier communication module 316 may communicate with a host device, such as the computer, or the network 318, via a variety of communication protocols (e.g., WI-FI®, BLUETOOTH®, NFC®, RFID®), CDMA, TDMA, or GSM). The verifier memory 314 may store a print quality verification program 320, the reference image 323, the offset 324, and the drifting offset 326.

While FIG. 3 depicts a verifier memory 314 and a verifier processor 310 in the verifier 302, it is to be understood that only the printer 328 or only the verifier 302, or both the printer 328 and verifier 302 communicatively coupled thereto may comprise the memory and the processor for executing the steps as hereinafter described (i.e., at least one of the verifier and the printer comprises a memory communicatively coupled to the imaging module and a processor communicatively coupled to the imaging module and memory). The verifier 302 that is attached to the printer may rely on the memory and the processor of printer for executing the steps as hereinafter described while the verifier 302 that is a standalone device has its own verifier memory 314 and verifier processor 310 for executing the steps as hereinafter described. Additionally, or alternatively, the printer may rely on the verifier memory 314 and the verifier processor 310 of verifier 302 attached to the printer for executing the steps as hereinafter described.

The imaging module 336 disposed in verifier 302 is configured to capture the representation of the printed image (e.g. the printed barcode 301 on the print media 312 in FIG. 3) within a field of view 303, using the image sensor 304 (i.e., the imaging module 336 comprises the image sensor 304). The image sensor 304 comprises the light source 306 for illuminating the field of view. The image sensor 304 uses an imaging lens (or lenses) to form a real image of the field of view 303 on an array of photo sensors (e.g., a linear or 2D array CCD, CMOS sensor, CIS device, etc.). Electronic signals from the photo sensors are used to create gray level or color images, e.g., which would result in a digital image that may be obtained by a digital camera.

While a thermal transfer printer-verifier and printer are described, it is to be understood that various embodiments of the present invention may be used in other types of printers (e.g., ink-drop printer, laser-toner printer, etc.). It is also to be understood that the print media can be supplied from other than a media supply spindle (e.g., in a "fan-fold" configuration).

B. Printer with a Pre-Print Image Scanner and a Post-Print Image Scanner

Figure 4:
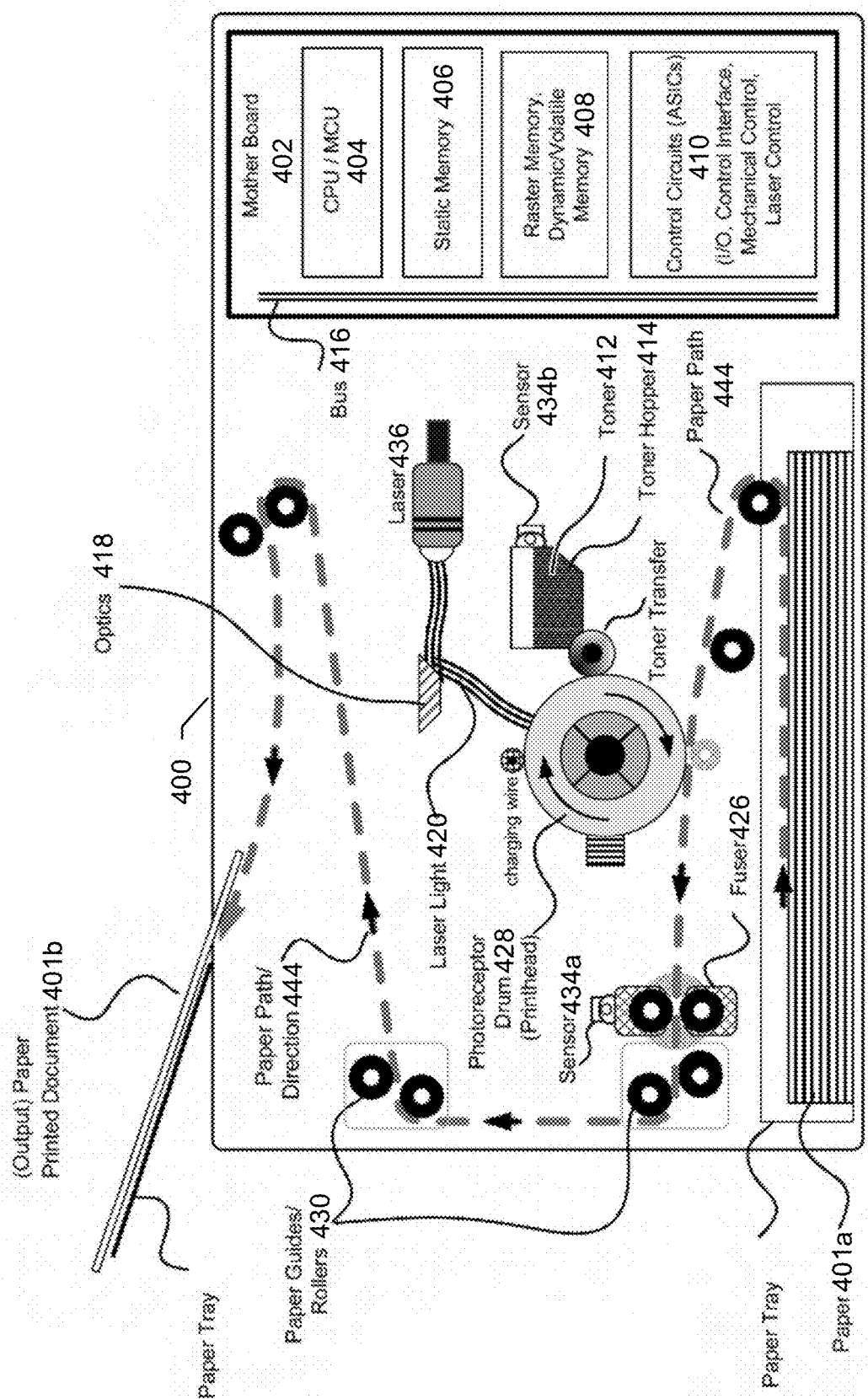
FIG. 4 is a cross-sectional schematic view of some internal operating elements of an exemplary printer, according to various embodiments of the present invention.

FIG. 4 illustrates some elements of an exemplary laser printer 400 in a cross-sectional, schematic view. While FIG. 4 illustrates a laser printer, it is noted that thermal printers and thermal printheads are discussed in conjunction with FIG. 6 below.

Laser printer 400 employs a laser 436 (for example, a semiconductor laser) to project laser light 420 onto an electrically charged, rotating cylindrical photoreceptor drum 428 (also referred to a "printhead 428"). The laser light 420 is suitably modulated (via printer electronics, discussed below) in accordance with a rasterized image (and/or rasterized text) on a source document page.

Photoconductivity on the photoreceptor drum 428 allows the charged electrons to fall away from the areas exposed to light. Powdered ink (toner) 412 particles are then electrostatically attracted to the charged areas of the photoreceptor drum 428 that have not been laser-beamed. Print media 401a, such as paper or other print media (such as acetate or labels, etc.), is passed through laser printer 400 by mechanical feed elements, such as paper guides/rollers 430. The print media 401a is transferred along paper path/direction 444. Along path/direction 444, the print media 401a makes contact with the photoreceptor drum 428. The photoreceptor drum 428 then transfers the image onto print media 401a by direct contact. Finally the paper or other print media 401a is passed onto a fuser 426, which uses intense heat to instantly fuse the toner/image onto the paper. The result is printed document 401*b*, which is imprinted with the durable, persistent image of the original raster-scanned page view.

Exemplary printer 400 may employ other elements as well. One or more motors and other electromechanical mechanisms are typically employed for purposes such as rotating the polygonal mirror which may be part of optics 418; driving the paper guides/rollers 430 which propel print media 401*a* through the printer; rotating photoreceptor drum 428 and other rotary elements; and generally effectuating transfer of print media 401*a* and materials within printer 400.

A variety of internal sensors may also be present in printer 400. For example, sensor 434*a* may monitor the temperature and/or pressure of fuser 426. Sensor 434*b* may monitor the amount of toner 412 left in toner hopper 414. Other sensors may monitor paper movement, the amount of electric charge on various elements, the rotary speed of various rotating elements, and other aspects of operations of printer 400. Some elements of printer 400 may have built-in sensors. Sensors are useful for monitoring the operational status of printer 400, and for identifying and reporting operational problems or errors.

A motherboard 402 typically holds and interconnects various microchips used to control and monitor printer 400. Motherboard 402 may include, for example and without limitation, a central processing unit (CPU) or MCU 404, static memory 406, raster memory, dynamic/volatile memory 408, control circuits (ASICs) 410, and system bus 416.

A central processing unit (CPU) (or microcontroller unit (MCU)) 404 provides overall operational control of printer 400. This includes monitoring printer operations via sensors 434*a* and 434*b*, and directing printer operations via various application specific integrated circuits (ASICs) 410 discussed further below.

Static memory 406 may store non-volatile operational code (such as internal device drivers) for printer 400. CPU/MCU 404 may employ the code stored in static memory 406 in order to maintain the operational control of printer 400.

Volatile printer raster memory 408, such as dynamic RAM (DRAM), may be used to store data received from external computers, such as page descriptions, raster images, and other data pertinent to the printing of particular documents.

Control of printer 400 may be maintained in various ways. In some embodiments, CPU/MCU 404 of printer 400 may directly control various elements of the printer (such as motors and other mechanical servers, etc.). In other instances, control may be effectuated by CPU/MCU 404 via various Application Specific Integrated Circuits (ASICs) 410, which act as intermediary control circuits 410.

Control circuits 410 may support such functions as external input/output (for example, via USB ports, an Ethernet port, or wireless communications); a control interface for a user control panel or wireless remote on the outside of the printer; mechanical control of motors and other electromechanical elements; and control of laser 436. In some embodiments of the printer 400, some or all control circuits 410 may not be on motherboard 402, and may instead by integrated directly in laser 436, fuser 426, toner hopper 414, and into various other electromechanical elements of printer 400.

A system bus 416 may serve to transfer data and messages between elements of motherboard 402, and between motherboard 402 and various other microchips, controllers, and sensors 434*a* and 434*b* of printer 400.

In various embodiments of the present invention, different printers 400 may implement these steps described above in distinct ways, and some elements may be referred to by other terms or generic terms. For example, the elements directly responsible for printing onto the print media 401*a* may be referred to generically as the printhead 428. In exemplary printer 400, either the photoreceptor drum 428 alone, or possibly the photoreceptor drum 428 in combination with fuser 426, may be thought of as the printhead 428. As another example, LED printers use a linear array of light-emitting diodes to "write" the light on the drum, and the array of light-emitting diodes may be referred to as the printhead 428. As another example, a thermal printer uses a heat-emitting element as the printhead 428.

In various embodiments of a laser printer 400, the toner 412 is based on either wax or plastic, so that when the paper passes through the fuser 426, the particles of toner melt. The fuser 426 can be an infrared oven, a heated pressure roller, or (on some very fast, expensive printers) a xenon flash lamp. The warm-up process that a laser printer goes through when power is initially applied to the printer consists mainly of heating the fuser element.

Figure 5:
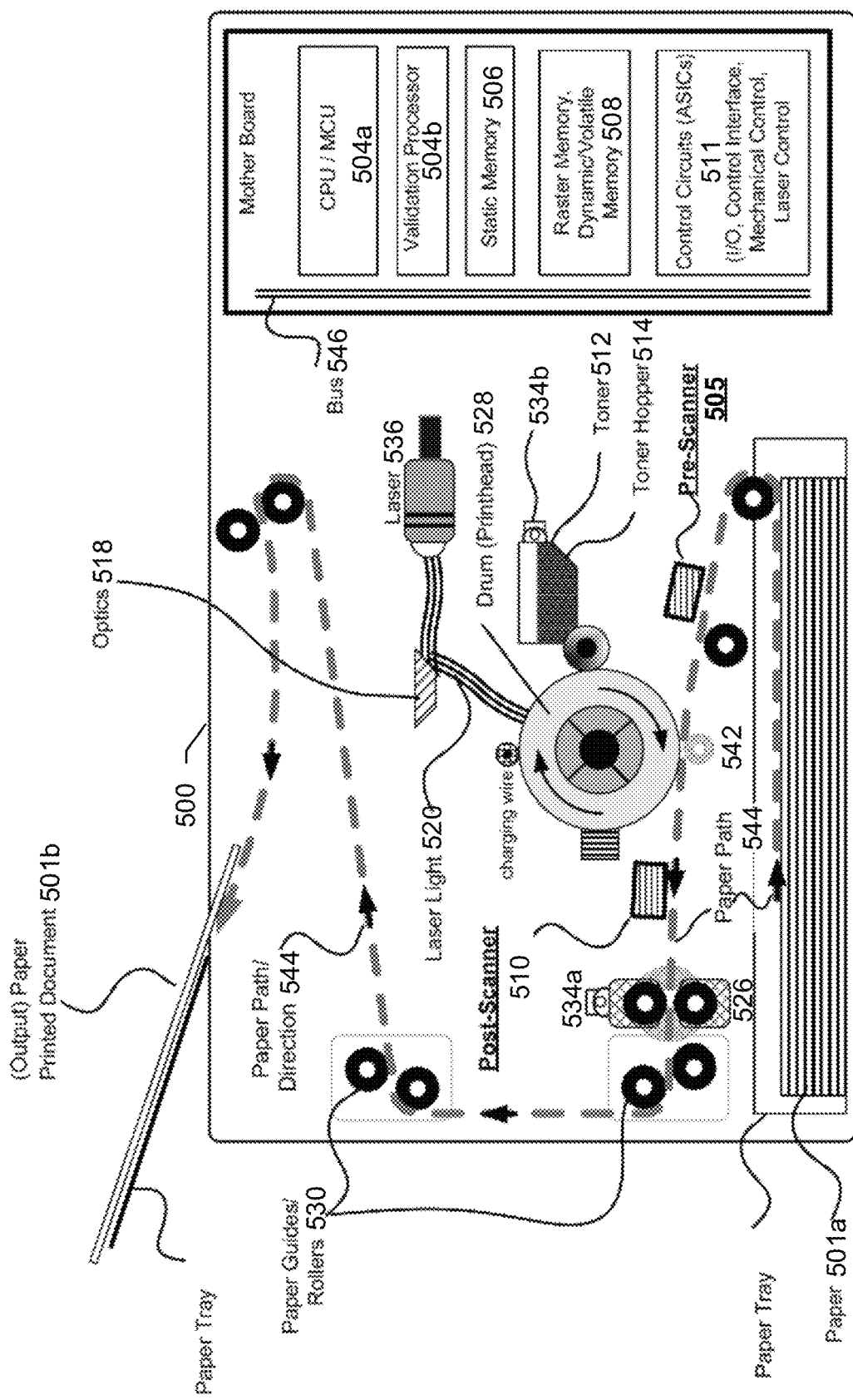
FIG. 5 is a cross-sectional schematic view of some internal operating elements of an exemplary printer, including a pre-print image scanner and a post-print image scanner, according to various embodiments of the present invention.

FIG. 5 illustrates some elements of an exemplary laser printer 500 (referred to generally herein as printer 500) in a cross-sectional, schematic view, according to the present system and method. Printer 500 may be configured to generate a printed document 501*b*, and may comprise similar elements as those in printer 400 discussed above in conjunction with FIG. 4.

For example, the printer 500 may comprise print media 501*a*, toner 512, toner hopper 514, optics 518, laser light 520, fuser 526, printhead 528, paper guides/rollers 530, sensors 534*a* and 534*b*, laser 536, and paper path/direction 544, similar to print media 401*a*, toner 412, toner hopper 414, optics 418, laser light 420, fuser 426, printhead 428, paper guides/rollers 430, sensors 434*a* and 434*b*, laser 436, and paper path/direction 444 described above in connection with FIG. 4, respectively.

In addition, the printer 500 may comprise CPU/MCU 504*a*, static memory 506, dynamic/volatile memory 508, control circuits 511, and bus 546, similar to CPU/MCU 404, static memory 406, dynamic/volatile memory 408, control circuits 410, and bus 446 described above in connection with FIG. 4, respectively.

As illustrated in FIG. 5, printer 500 has two additional elements, a pre-print image scanner 505 (also referred to as pre-scanner 505) and a post-print image scanner 510 (also referred to as post-scanner 510), both designed and configured to scan print media as the print media is transported through printer 500 along paper path/direction 544. For the additional processing, pre-print image scanner 505 and post-print image scanner 510 are both configured to function with CPU 504*b*, and possibly with one or more dedicated ASICs 511, to create an internal digital page image of print media. Firmware or software stored in static memory 506 may support the image processing as well, for example by defining image processing operations to be performed by CPU/MCU 504*a* (also referred to as processor 504*a*) and/or by CPU 504*b* (also referred to as dedicated validation processor 504*b*).

As discussed above, in some embodiments of the present system and method, a printer configured for the image comparison and validation tasks may have two processors. The first processor may perform the processing tasks associated with printing; while a second, dedicated validation processor (which may be a digital signal processor or a math co-processor) performs some or all calculations and/or logic pertaining specifically to image comparisons and validations, as described further below. In alternative embodiments, a single CPU performs both the processing involved in printer operations and the image comparison/validation calculations/logic of the present system and method.

Scanners 505, 510 are devices that optically scan images, printed text, and graphics on print media. In an embodiment, "scanner" 505, 510 refers to a printer element which optically captures the image(s) or text on print media, and converts the image capture to an electrical representation (which may be analog or digital) for further processing.

In some contexts, the term "scanner" refers to an entire self-contained machine, usually termed a "document scanner," which is designated principally or exclusively for image scanning. For example, either or both of pre-print image scanner 505 and post-print image scanner 510 could be an external scanner that is external to and separate from printer 500. In such an embodiment, the method of the present system may be performed in whole or in part by an external processor that is communicatively coupled with printer 500 and the external scanner(s).

A variety of scanning technologies may be employed in various embodiments of the present system and method. Scanners may employ 1D or 2D images sensors, such as charge-coupled device (CCD) or a contact image sensor (CIS) for image sensing. As another example, drum scanners use a photomultiplier tube (PMT) as the image sensor. A rotary scanner is a type of drum scanner that uses a CCD array instead of a photomultiplier. These and other types of scanners may be employed in various embodiments of the present system and method.

In some embodiments, the present system and method may employ scanners (pre-print image scanner 505 and post-print image scanner 510) which scan in black and white only. Black and white scanners may be less expensive than color scanners, while still providing sufficient image data for error-detection purposes. In some alternative embodiments, the present system and method may employ color scanners.

In some embodiment of the present system and method, the resolution of the scanners 505, 510 is at least twice the print frequency (that is, twice the Nyquist frequency). For example, in one exemplary embodiment, if the printing resolution is 600 dots per inch, the scanning resolution may be at least 1200 dots per inch. Higher resolution embodiments may be provided as well. In an alternative embodiment, and for example to reduce production costs, scanners 505, 510 may be employed which scan at less than twice the print frequency, though possibly with some reduction in the reliability of print-error detection.

As may be appreciated from FIG. 5, the pre-print image scanner 505 is structurally situated within printer 500 so that the pre-print image scanner 505 scans print media 501a when the paper has not yet been imprinted by printer 500. (At this stage, print media is labeled as paper or print media 501a in FIG. 5.) That is, pre-print image scanner 505 is positioned along paper path/direction 544 so as to be before, or prior to, the photoreceptor drum or printhead 528 along paper path/direction 544. In terms of a time sequence of printer events, scanning of print media 501a by pre-print image scanner 505 occurs previous in time to the actual transfer of toner 512 from the photoreceptor drum 528 to print media 501a. In this way, pre-print image scanner 505 obtains an image of print media 501a before printing. If there is any pre-printed document element (such as pre-print text/logo/banner) on print media 501a, the pre-printed document element will be captured by pre-print image scanner 505.

As may also be appreciated from FIG. 5, the post-print image scanner 510 is structurally situated within printer 500 so that the post-print image scanner 510 scans print media only after the print media has been imprinted by printer 500. (At this stage, even if not yet treated by fuser 426, the paper may be considered to be printed document 501b.) That is, post-print image scanner 510 is positioned along paper path/direction 544 so as to be after, or subsequent to, the photoreceptor drum 528 along paper path/direction 544. In terms of a time sequence of printer events, scanning of printed document 501b by post-print image scanner 510 occurs subsequent in time to the actual transfer of toner 512 from the photoreceptor drum 528 to printed document 501b. In this way, post-print image scanner 510 obtains an image of print media after printing. Post-print image scanner 510 therefore captures any kind of pre-print text/logo/banner on printed document 501b, along with any text, images, symbols or graphics which are newly printed onto the printed document 501b by printer 500.

In the embodiment as illustrated in FIG. 5, post-print image scanner 510 is structurally situated after the photoreceptor drum 528 but before or prior to fuser 526. In alternative embodiments, post-print image scanner 510 may be situated along paper path/direction 544 at an internal location which is after or subsequent to fuser 526, thereby ensuring that toner 512 has been firmly bonded onto printed document 501b prior to the post-scanning by post-print image scanner 510.

In an alternative embodiment, either or both of pre-print image scanner 505 and post-print image scanner 510 may be external to printer 500. For example, standardized pre-printed media (such as a company letterhead stationary) may be scanned externally, with the resulting pre-printing image later transferred to printer memory. After printing by printer 500, a printer-internal post-print image scanner may generate a resulting post-printing image capture. Appropriate steps of the image comparison method (discussed below) may then be applied to externally obtain pre-printing image and internally obtained post-printing image.

In some embodiments of the present system and method, a single printer scanner may function in the capacities or functions of pre-print image scanner 505 and post-print image scanner 510. In these embodiments, a single sheet of print media makes two passes through the printer 500. On the first pass, the print media is not printed on, and is scanned for pre-print matter to generate pre-printing image. On the second pass of the same print media, printer 500 prints on print media. The single scanner then scans the printed sheet, generating post-printing image. Suitable structural adaptations and changes may be made to the paper path/direction 544, paper guides/rollers 530, and the placement of single scanner to allow for the necessary two passes of print media through printer 500. In an embodiment, the single scanner is positioned in the post-print direction (for example, in the location of post-print image scanner 510 as shown in FIG. 5). The print media 501a would first be fed past printhead 528 without printing on the print media 501a, solely for purposes of scanning the print media 501a to obtain pre-printing image. The paper guides/rollers 530 may then route the print media 501a back to printhead 528. On the second pass, printing occurs. The printed document 501b then passes the single scanner, which obtains post-printing image.

As described above, various embodiments of the present invention may be employed in a thermal printer. A thermal printer may have many elements in common with the exemplary printer-verifier 200 of FIGS. 2A-2B, printer 328 of FIG. 3, printer 400 of FIG. 4, and printer 500 of FIG. 5, including (for example and without limitation) a paper tray or paper trays, paper guides/rollers, a pre-print image scanner, a post-print image scanner, a motherboard with a variety of appropriate microchips, and other elements. Some of these elements may be arranged or configured differently for a thermal printer as compared to a laser printer. A thermal printer also has a printhead, but the printhead of a thermal printer may be distinctive in design from the printhead of a laser printer.

Figure 6:
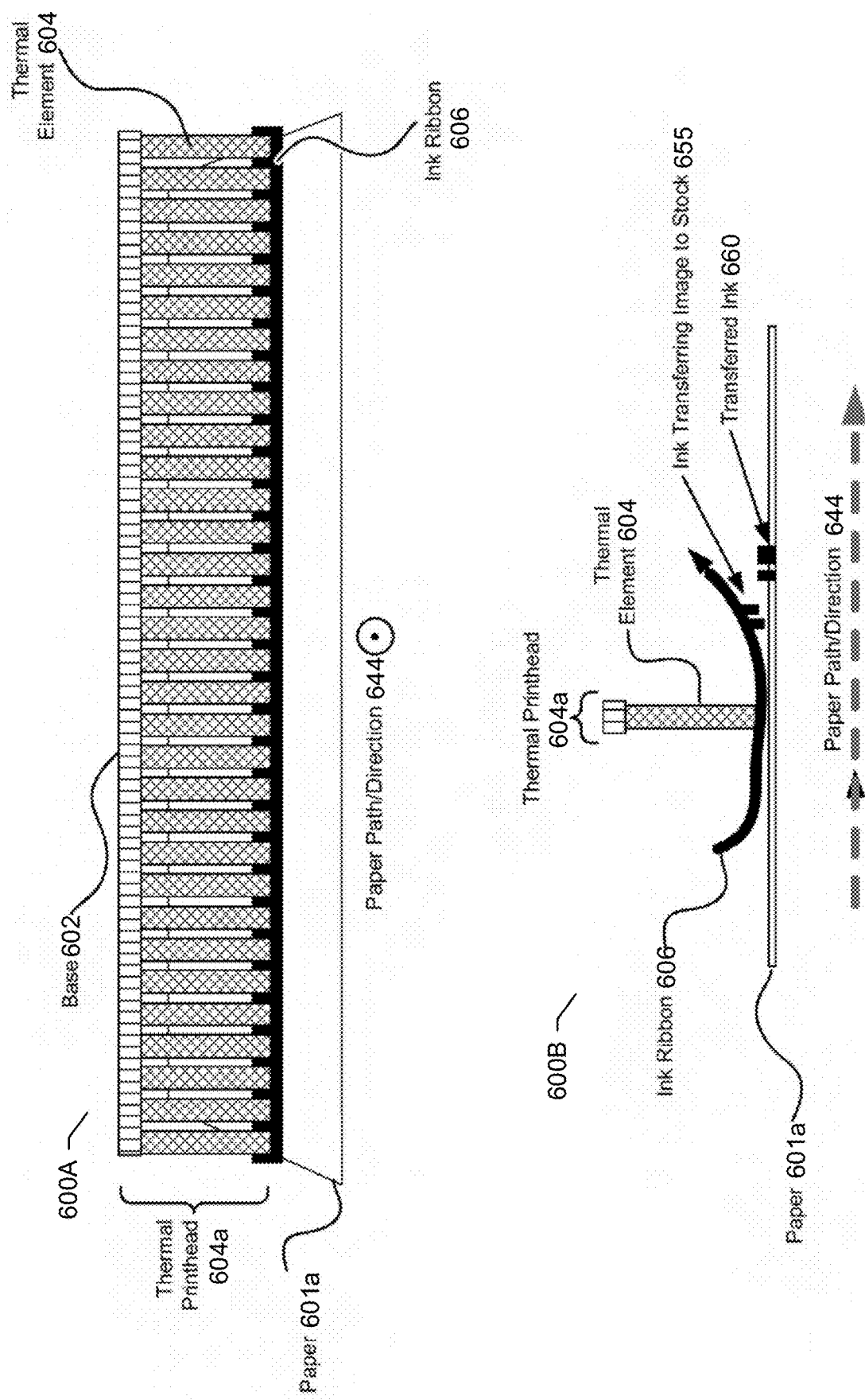
FIG. 6 illustrates an exemplary thermal printhead, according to various embodiments of the present invention.

FIG. 6 illustrates two views 600A, 600B of an exemplary thermal printhead 604a. As seen in view 600A, thermal printhead 604a may include multiple thermal elements 604, each thermal element 604 configured to print a pixel on a print media 601a. The thermal elements are typically equally spaced in a linear arrangement, and connected to an extended linear base 602, which may include various connectors, electrical conductors, and other electrical elements. The base 602, along with the collective assemblage of thermal elements 604, are typically configured to span at least the expected width of a sheet of print media 601a to be printed on by the thermal printhead. Each thermal element 604 is configured to be separately and selectively heatable under the control of suitable printer electronics.

Also shown in view 600A is an ink ribbon 606. Upon being heated by a thermal element 604, the ink ribbon 606 is suitable for transferring ink to a print media 601a which moves past thermal printhead 604a in a suitable direction 644. In this way, an image may be impressed upon print media 601a. It may be noted that the present invention may also correspond to other such printer technologies, without deviation from the scope of the disclosure.

Also shown in FIG. 6 is a cross-sectional side-view 600B of thermal printhead 604a. As print media 601a moves under a thermal element 604, the thermal element may be intermittently heated (or continually heated, if appropriate for the print output at hand). Heat from thermal element 604 causes ink 655 to transfer from ink ribbon 606 to print media 601a, resulting in transferred ink 660 impressed upon print media 601a. Because ink 655 is melted onto print media 601a, some blurring or spreading of ink 655 is possible in forming transferred ink 660. As a result, an image formed on print media 601a may have some variation in ink transfer, as compared with the toner transfer process of an exemplary laser printer. This may result in some variations in edge sharpness of the thermal printer output, or some degree of edge blur.

As described further below, the present system and method may be configured to identify a difference between an actual edge sharpness or edge blur of a print output or validation image, compared with an expected edge sharpness or edge blur of the intended image. The method may further distinguish an acceptable output from an unacceptable output based on a specified threshold criteria for an acceptable degree of edge sharpness or edge blur.

III. Example Method for Implementing Embodiments of the Present Invention

Embodiments of the present invention may be implemented as methods for verifying printed image and improving print quality.

A. Generating Printed Documents

In accordance with various embodiments of the present invention, a printer may generate printed documents from print media. The steps of generating printed documents may include, for example, (1) raster image processing, (2) applying a negative charge to the photosensitive drum, (3) exposing drum to laser light, (4) developing the image on the drum, (5) transferring image to paper, (6) fusing, and (7) cleaning and recharging. Details of the steps are described hereinafter with reference to FIGS. 5 and 10.

(1) Raster Image Processing

The document to be printed is encoded in a page description language such as PostScript, Printer Command Language (PCL), or Open XML Paper Specification (OpenXPS). This is may be performed by an external computer connected to the printer 500. In some cases, however, the source document is encoded on printer 500 itself, for example, when printer 500 functions in a dual role as a document scanner.

Figure 10:
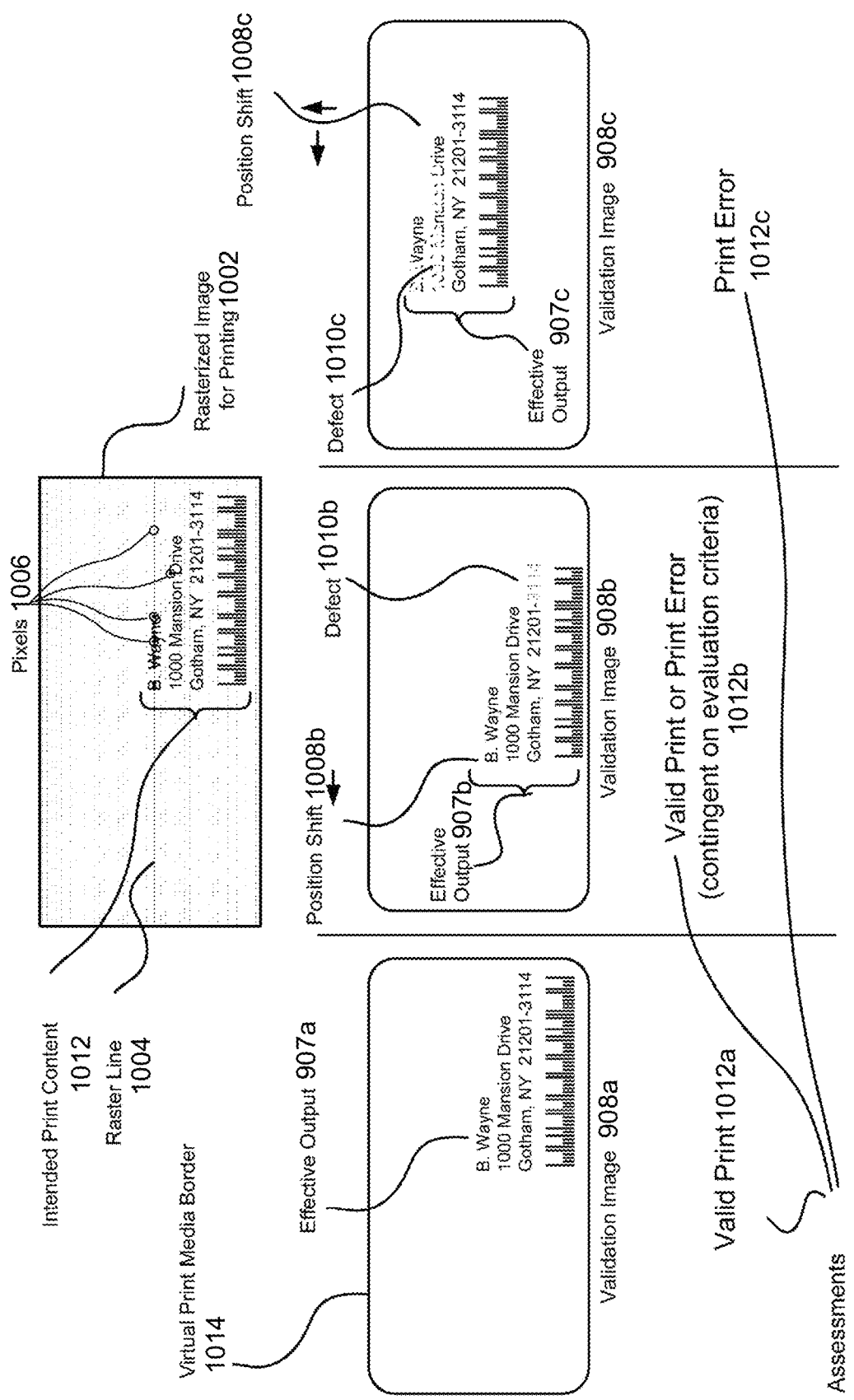
FIG. 10 illustrates several exemplary comparisons between exemplary validation images and an exemplary rasterized image for printing, according to various embodiments of the present invention.

A raster image processor converts the page description into a bitmap which is stored in the printer's raster memory 508 as shown in FIG. 5. As shown in FIG. 10, each horizontal strip of dots across the raster image 1002 is known as a raster line 1004 or scan line 1004. In an embodiment, raster image processing may be performed by the hardware microprocessor of an external computer (for example, the same computer which generates the page description language). In an alternative embodiment, the conversation from a page description language to a raster image 1002 as shown in FIG. 10 is performed on printer 500 itself, for example by the CPU/MCU 504a employing instructions stored in static memory 506. A laser printer may employ printer raster memory (which is typically volatile raster memory 508, such as DRAM) to hold the bitmap image of an entire raster image 1002 or multiple pages.

(2) Applying a Negative Charge to the Photosensitive Drum

A corona wire positioned parallel to the drum or a primary charge roller projects an electrostatic charge onto the revolving photoreceptor drum 528, which is capable of holding an electrostatic charge on its surface while it is in the dark.

(3) Exposing Drum to Laser Light

Laser light 520 selectively neutralizes the negative charge on the photoreceptor drum 528, to form an electrostatic image. Lasers 536 can form highly focused, precise, and intense beams of light. The laser 536 aims laser light 520 at printer optics 518. Printer optics 518 may include a rotating polygonal mirror and a system of lenses and mirrors (not illustrated in detail), which directs the laser light 520 onto the photoreceptor drum 528, writing image/page pixels 1006 as shown in FIG. 10 onto the photoreceptor drum 528. The photoreceptor drum 528 rotates during the laser sweep. The stream of rasterized data (such as the raster image 1002 held in the printer's raster memory 508) rapidly modulates the laser 536 and laser light 520 as it sweeps.

The laser light 520 neutralizes (or reverses) the charge on the surface of the drum 528. That is, the areas, which are struck by the laser light 520 on the photoreceptor drum 528, momentarily have no charge. The result on the drum's surface is a latent, static electric negative image of the rasterized source page.

(4) Developing the Image on the Drum

Toner 512 consists of fine particles of dry plastic powder mixed with carbon black or coloring agents. Particles of the toner 512 are given a negative charge inside the toner hopper 514. As particles of the toner 512 emerge onto the photoreceptor drum 528, they are electrostatically attracted to the latent image on the photoreceptor drum 528 (the areas on the surface of the photoreceptor drum 528 that had been struck by the laser). Because negative charges repel each other, the negatively charged toner particles will not adhere to the photoreceptor drum 528 where the negative charge remains (imparted previously by the charge roller).

Toner 512 is pressed against drum 528 by a toner-coated transfer roll, so the toner 512 is transferred from the surface of toner-coated transfer roller to the uncharged portions of the surface of the photoreceptor drum 528.

(5) Transferring Image to Paper

A sheet of print media 501*a* is then rolled under the photoreceptor drum 528, which has been coated with a pattern of toner particles in the exact places where the laser struck it moments before. The toner 512 particles transfer from the surface of the photoreceptor drum 528 to the print media 501*a*.

Some printers may employ positively charged transfer roller 542 on the back side of the paper to help pull the negatively charged toner from the photoreceptor drum 528 to the print media 501*a*.

(6) Fusing (Toner Melted onto Paper with Heat and Pressure)

Print media 501*a* passes through rollers in the fuser 526, where high temperatures and pressure are used to permanently bond the toner 512 to print media 501*a*. One roller is usually a heat roller, and the other is a pressure roller. The result is that source print media 501*a* has been transformed, via this print process, to printed document 501*b* with the desired text, image(s), and/or graphic(s).

(7) Cleaning and Recharging

As the photoreceptor drum 528 completes a revolution, it is exposed to an electrically neutral soft blade that cleans any remaining toner from the photoreceptor drum and deposits it into a waste reservoir. Charge roller then re-establishes a uniform negative charge on the surface of the now clean drum, readying it to be struck again by the laser light 520.

B. Verifying Printed Document

Figure 7:
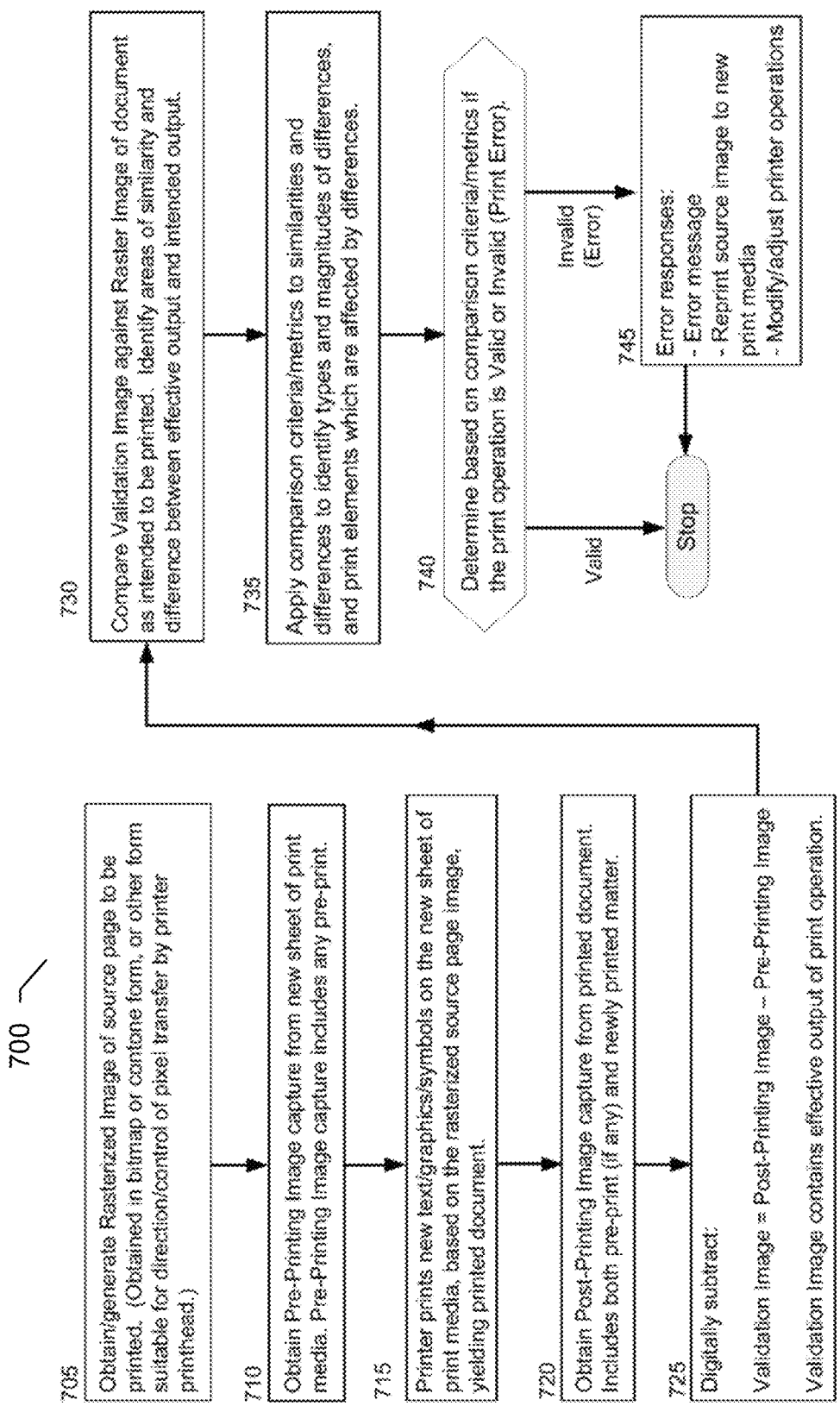
FIG. 7 is a flowchart of an exemplary method for robust printed image verification, according to various embodiments of the present invention.

FIG. 7 is a flowchart of an exemplary method 700 for print quality verification, and print-error detection by a printer, such as printer 500 which employs a pre-print image scanner 505 and a post-print image scanner 510. The method and flowchart highlight the main steps of an exemplary embodiment, details of which are further described in connection with FIGS. 8-10.

It will be understood that exemplary method 700 is performed by a hardware processor (such as processor 504*a* or validation processor 504*b*) of an exemplary printer, in conjunction with or controlled by suitable computer code which implements the method. The code may be encoded directly into either of the logic of processor 504*a* or 504*b*, or may be stored as firmware in a static memory (such as static memory 506), or may be part of device driver code stored (for example, volatile printer raster memory 508). In an alternative embodiment, the method 700 may be performed in whole or in part by a hardware processor of an external computer which is linked to a printer by a suitable wired or wireless communications means.

Method 700 begins with step 705, where the printer either (i) receives a page description of a new page to be printed, and generates (via processor 504*b*) a rasterized image for storing and printing; or (ii) directly receives and stores the rasterized image of the page for printing. The rasterized image may be stored in printer raster memory 508.

In step 710 of method 700, pre-print image scanner 505 of printer 500 scans a new sheet of print media 501*a*, which may be a unprinted media. The scan generates pre-printing image, which includes any pre-print text/logo/banner that was on the unprinted media. Pre-printing image may be stored in printer raster memory 508.

In step 715 of method 700, printhead 528 prints output new documents elements, such as new text/new graphics, on the print media 501*a*, based on the rasterized image, resulting in printed document 501*b*.

In step 720 of method 700, post-print image scanner 510 of printer 500 scans the printed document 501*b*. The scan generates post-printing image, which includes both pre-print text/logo/banner (if any) and the newly printed documents elements. Post-printing image may be stored in printer raster memory 508.

In step 725 of method 700, pre-printing image is subtracted from post-printing image, resulting in validation image. Validation image may be stored in printer raster memory 508. Validation image contains only the effective printed output of the print operation, details of which are further illustrated hereinafter).

In step 730 of method 700, the validation image is compared against the rasterized image of the document as it was intended to be printed, and areas of similarity and difference are identified. In an embodiment, the comparison may involve digital comparisons of images, for example, on a bitmap basis. In an alternative or complementary embodiment, comparisons may entail optical character recognition of alphanumeric elements of the images, followed by comparison of the recognized characters.

In step 735 of method 700, and based on the comparison of step 730 between the validation image and rasterized image, designated comparison rules and/or comparison metrics are applied. In an embodiment, the comparison rules and/or metrics are applied against any identified different and same/similar print elements/areas to determine types and degrees of differences and similarities (for example, a degree to which text or image is blurred or a degree to which a text or image has reduced contrast). In an alternative or complementary embodiment, the rules are also applied to identify types of print elements which are affected (for example, bar codes, matrix codes, parts of addresses, part numbers, etc.).

In step 740, and based on the further application of comparison rules/metrics, method 700 assesses if the effective printed output on printed document 501*b* is considered to result in a valid print operation or a print error.

In an embodiment, if the print operation assessment is "valid," method 700 may stop. In an embodiment, the printer 500 may further specifically issue a notification or message that the print operation was valid.

In an embodiment, if the print operation assessment is "invalid," (or equivalently, "Print Error"), then printer 500 may have one or more suitable responses as per step 745. In an embodiment, printer 500 may issue a suitable notification to a user interface that the print operation was invalid. In an alternative or complementary embodiment, printer 500 may attempt to reprint the same image to a new sheet or label of print media. In an alternative or complementary embodiment, printer 500 may attempt to adjust printer operations to avoid similar errors in future print operations.

In alternative embodiments consistent with the scope of the appended claims, some steps described above may be deleted or added, and some steps may be performed in a different order or manner.

(1) Capturing Images

Figure 8:
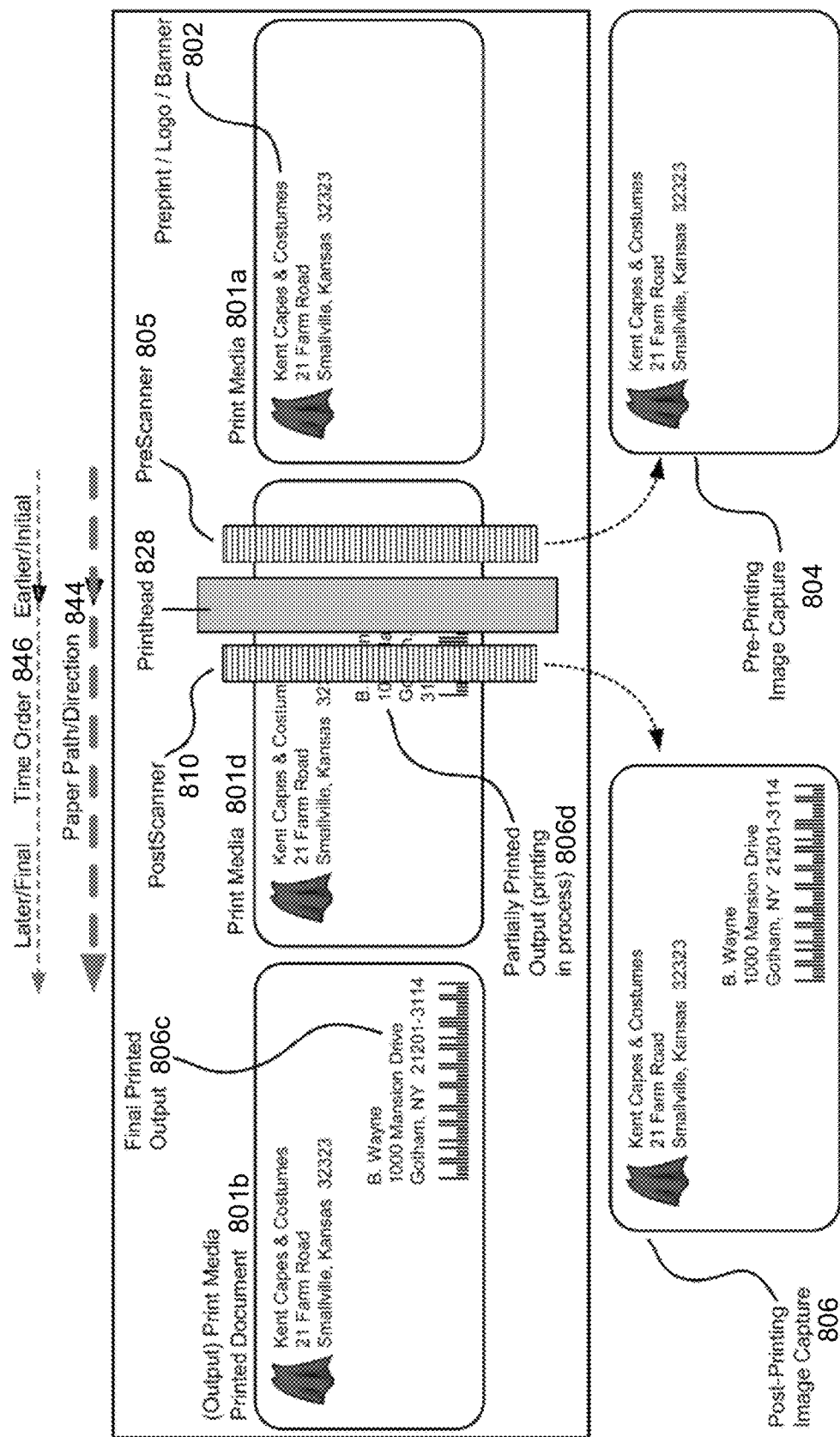
FIG. 8 illustrates an exemplary transfer of a print media through a printer and the printing on the print media, according to various embodiments of the present invention.

FIG. 8 illustrates an exemplary scan of a print media as the print media is transferred through an exemplary printer during a print process. In FIG. 8, printer is viewed from a top cross-sectional simplified view.

It will be appreciated that the printer as illustrated may include, for example and without limitation, various printers described above, such as a thermal printer (see FIG. 6), a laser printer (see FIG. 5), an LED printer, a dot-matrix printer, an impact printer, and other kinds of printers as well. Most internal elements of the printer are not illustrated in FIG. 8. Internal elements of printer which are illustrated are pre-print image scanner 805, printhead 828 (which may be, for example and without limitation, a thermal printing element (see FIG. 6), a laser-printer drum, an LED array, an impact printhead, or an inkjet printhead), and post-print image scanner 810.

Also illustrated is a single pre-print media, such as a label or an envelope, in three stages as it passes through printer. Shown at right is the print media 801*a* before it has reached the printhead 828, and so before an imprinting. Shown towards the center of FIG. 8 is the same print pre-print media 801*d* when it is partially past printhead 828, and so partially printed with partial output 806*d*. After being fully printed with final printed output 806*c*, the printed document 801*b* is generated. FIG. 8 also indicates the time-order 846 or paper path/direction 844 of the print media's position/movement in relation to movement past printhead 828.

FIG. 8 also illustrates the images captured by pre-print image scanner 805 and post-print image scanner 810. Because pre-print image scanner 805 is positioned before printhead 828, the pre-printing image capture 804 shows only the pre-print text/logo/banner 802 of the print media 801*a*. Because post-print image scanner 810 is positioned after printhead 828, the post-printing image capture 806 shows both the pre-print text/logo/banner 802 and the final printed output 806*c* of printed document 801*b*.

As described above and will be discussed in further details, pre-printing image capture 804 and post-printing image capture 806 may be analyzed against an original, digital rasterized image of the intended output of a print operation. The result of the analysis is a determination of whether the print operation was valid or not. "Valid" means the print operation resulted in print which is identical to the intended output, or that the print result is sufficiently similar (by designated standards) to the intended output so as to be a useful print result.

In an embodiment of the present system and method, image analysis may, strictly for convenience, be characterized as having method steps which fall into one stage, into two stages, or more than two stages. For convenience of exposition, the process discussed immediately below is characterized as having two stages: subtracting images and comparing images. However, nothing in the present disclosure limits the present system and method to any particular number of stages.

(2) Subtracting Images

In an embodiment of the present system and method, a first stage of print validation processing may entail subtracting the pre-printing image capture 804 from the post-printing image capture 806 of the same sheet or item (for example, a label) of the print media.

In accordance with various embodiments of the present invention, the image subtraction is a digital comparison process. In various embodiments of the present system and method, algorithms employed for image subtraction may vary in details. In general, image subtraction entails designating a second image (such as a pre-printing image capture 804) which will be subtracted from a first image (such as a post-printing image capture 806), and then:

(i) if needed, resizing either or both of pre-printing image capture 804 and post-printing image capture 806; and/or aligning pre-printing image capture 804 and post-printing image capture 806, so that the two images can be compared on a basis of pixels which should be corresponding pixels (for example, same x-y coordinates) between the two images;

(ii) reducing each of the first image and the second image to independent, mutually adjacent pixels which together form the entire image. Assuming both images are of the same size and geometry (for example, rectangles of the same size), both images are typically mapped to respective pixel matrices with identical numbers of rows and columns, and so corresponding pixels;

(iii) providing each pixel with one or more suitable mathematical values, which may for example be a degree of lightness or darkness (for example, a value of "0" indicating a perfectly black pixel, "255" indicating a white pixel, and values between 0 and 255 indicating appropriate shades of grayscale (for an eight bit data scan)). Scanners with higher or lower data bits per pixel may employ other ranges of gray scale values. In some embodiments, multiple values may be applied per pixel to indicate color valuations;

(iv) for each corresponding pixel in the first image and second image, subtract the second image pixel value from the first image pixel value; and (v) the result of the subtraction is the pixel value for the corresponding pixel in the resulting validation image.

Figure 9:
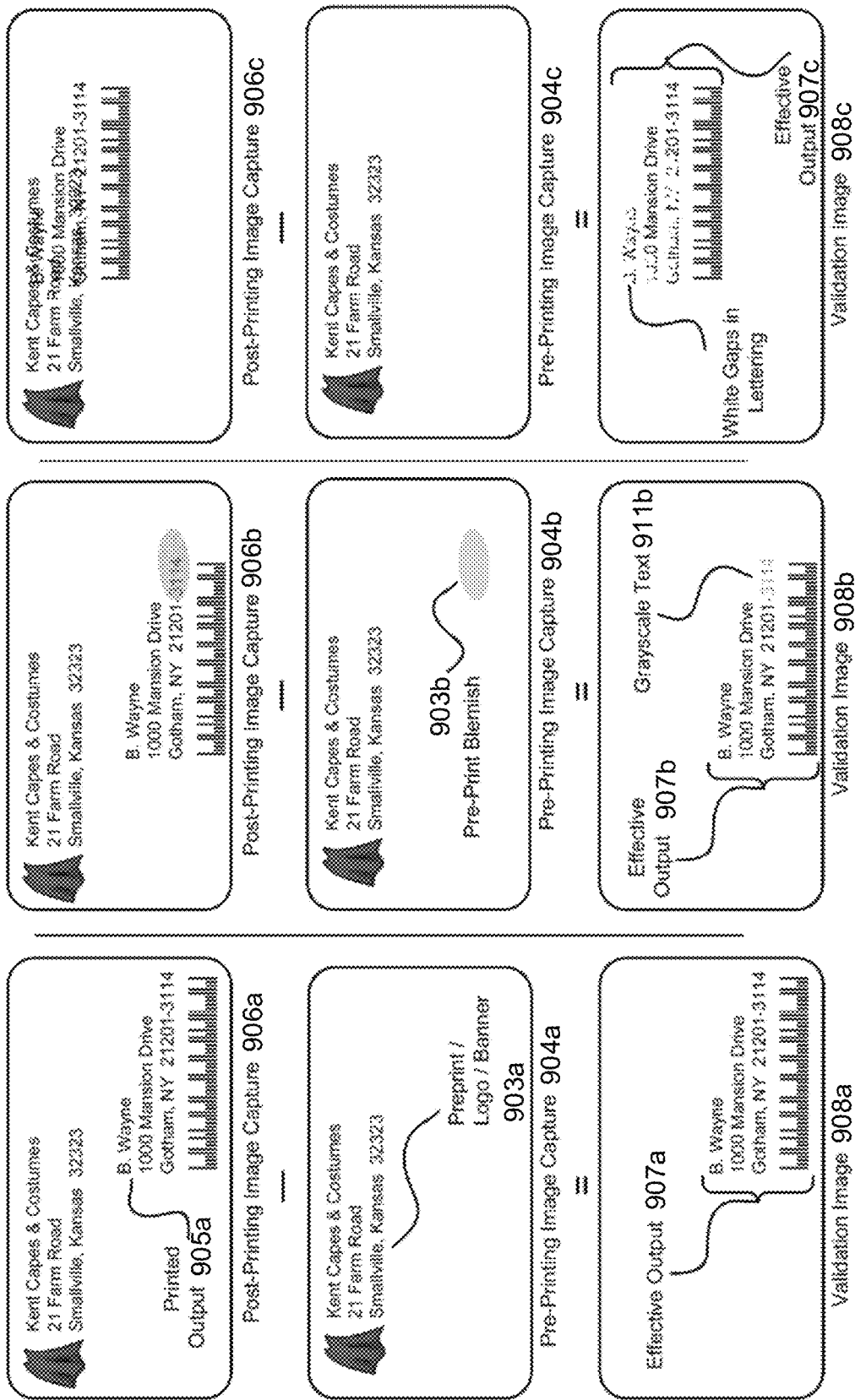
FIG. 9 illustrates several exemplary subtractions of a pre-print image from a post-print image, resulting in several exemplary validation images, according to various embodiments of the present invention.

FIG. 9 illustrates three exemplary image subtractions according to the present system and method.

In FIG. 9, the left-most column illustrates a first exemplary image subtraction. Pre-printing image capture 904*a* has captured only the pre-print text/logo/banner 903*a* of a mailing label, envelope, or similar print media. The pre-printing image capture 904*a* is subtracted from the post-printing image capture 906*a*, which has captured both the pre-print text/logo/banner 903*a* and the newly printed output 905*a*. The result of the subtraction process is the validation image 908*a*. Because the pre-print text/logo/banner 903*a* was common to both images in the subtraction process, that data is effectively cancelled out. As a result, validation image 908*a* contains only the effective newly printed output 907*a*. Further evaluation of validation image 908*a* is presented below in conjunction with FIG. 10.

In FIG. 9, the center column illustrates a second exemplary image subtraction. Pre-printing image capture 904*b* has captured the pre-print text/logo/banner only of a mailing label, envelope, or similar print media. It will be seen from the figure that, in this instance, the pre-printed logo had a "smudge," blemish, or other unexpected print matter, such as the blemish 903*b*.

In FIG. 9, the center column illustrates the corresponding post-printing image capture 906*b*, which has captured both the blemish and the newly printed output. It may be apparent (simply from visual inspection) that the output address and bar code appear displaced to the left, as compared with the similar address and bar code in the left-most column. Further assessment of this by the present system and method is presented in conjunction with FIG. 10, below.

The pre-printing image capture 904*b* is subtracted from the post-printing image capture 906*b*. The result of the subtraction process is the validation image 908*b*. It can be observed from FIG. 9 that, during the subtraction process, shaded pixel values corresponding to smudge (such as the blemish) were subtracted from pixel values that represented newly printed output. The result is that pixel values for the last four digits of the zip code now indicate grayscale text 911*b* (as illustrated) rather than black text as shown elsewhere. Further evaluation of validation image 908*b* presented below in conjunction with FIG. 10.

In FIG. 9, the right-most column illustrates a third exemplary image subtraction. Pre-printing image capture 904c has captured the pre-print text/logo/banner only of a mailing label, envelope, or similar print media. (As with the example in the left-most column, and unlike the middle column, no "smudge" is present in this example.)

The post-printing image capture 906c, which has captured both the pre-print text/logo/banner and the newly printed output. It may be apparent (simply from visual inspection) that the output address and bar code are displaced both upwards and to the left, as compared with the similar address and bar code in the left-most column. The vertical displacement is sufficiently extreme that the address in the printed output partly overlaps the text of the pre-printed logo/banner.

The pre-printing image capture 904c is subtracted from the post-printing image capture 906c. The result of the subtraction process is the validation image 908c. Because the pre-print text/logo/banner and the newly printed output overlapped, and the pixels for both were black pixels, the overlapping pixels are effectively cancelled out (since they cannot be readily distinguished by a reader). As a result, it can be seen from visual inspection that the effective printed output 907c of validation image 908c contains gaps (or white spots) in some of the lettering of the output address. Further evaluation of validation image 908c is presented below in conjunction with FIG. 10.

In an embodiment, and based on foregoing discussion in this document, the validation image of a printed document may contain the effective printed output (that is, the text or graphics that were effectively printed on print media (since any pre-print text/logo/banner were stripped out in generating validation image)). In an alternative embodiment, image processing may be used to compensate for pre-print text/logo/banner, so that the validation image may contain the actual printed output printed on the document.

"Effective printed output" refers to the printed image that is effectively visible to a person viewing the printed document after printing. In many cases, the effective printed output will be the same as the printed output; that is, what a person (or other optical scanner) sees on print media is the same as whatever printer printed on the print media. However, there may be exceptions.

For example, newly printed output may partly or totally overlap with pre-print text/logo/banner. Or, newly printed output may partly or totally overlap with a pre-printed pattern or texture which fills some or all of print media. Or, newly printed output may partly or totally overlap with a blemish, wrinkle, or tear on some or all of print media.

In any of these cases, the visual effect may be to reduce the output contrast between newly printed output and the pre-print text/logo/banner or the background pattern/texture. As a result, the portion of the effective printed output subject to overlap will typically show reduced contrast (as compared with newly printed output which is printed on a clean, purely white background). This reduced contrast output may be displayed, on validation image, as grayscale text or reduced contrast text or graphics. If the pre-print text/logo/banner or a blemish is entirely black, this may completely obscure affected parts of the print output, rendering the effective printed output in these areas as being no output at all (that is, effectively "white" and not visible).

(3) Comparing Images

The digital, rasterized image of a document, stored in raster memory of printer, is the version of the document that either: (i) was transmitted to the printer electronically from a document source (such as an external computer); or (ii) was generated internally within the printer based on a received page description, again received from a document source. In the case of a combined printer/scanning device, such as a fax/printer (not illustrated in the figures), the rasterized image may be obtained by first scanning a document by an exterior scanning element of the fax/printer. In any of these cases immediately above, the rasterized image therefore represents the document it was intended to be printed.

In an embodiment of the present system and method, a second stage of print validation may entail comparing a validation image of a printed document against the digital raster image of the document as it was submitted to and/or generated within printer. By comparing the validation image against the original, rasterized image of the source document, the present system and method may determine whether the finished printed document was printed correctly or had one or more print errors.

In some embodiments of the present system and method, comparison algorithms determine if two images—the rasterized image of the original source document and the validation image—are substantially the same or not. Further, in embodiments of the present system and method, the comparisons may involve primarily alphanumeric symbols (which have clear and distinctive outlines) and graphics (such as barcodes) which often also employ specific, clear line drawings.

One or more methods may be employed for such a comparison and similarity determination, either alone or in combination, including for example and without limitation:

(i) The rasterized image and the validation image are both represented by two dimensional matrices of equal dimensions, with matrix values corresponding to the grayscale-luminosity of pixels in each raster image. The matrices are compared on a point-by-point basis to determine if the intensity values are substantially the same. In an alternative embodiment, a matrix may employ multiple values for each pixel to capture color information, which may also be compared on a point-by-point basis. If the rasterized image matrix and the validation image matrix have the same, or substantially the same values, on a pixel-by-pixel basis, the two images are substantially the same. In performing such comparisons, the present system and method may make allowances, or have designated tolerance limits, for some variations in pixel values between the two matrices.

For example, in an exemplary embodiment where grayscales are rated from 0 to 255, any pixel in a range from 0 to a designated maximum value (such as 10 or 20) may be considered "black"; any pixel in a range from 226 to 255 may be considered white. In general, any two pixels which correspond in position in the two matrices and are within a designated value range of each other (for example, within 10 points from each other) may be considered to be identical pixels. Similarly, allowances and tolerances may be established for pixel variations at edges or borders of alphanumeric symbols or at borders of other symbols or graphics.

(ii) During a print process, printed output, such as text or graphics, may be shifted somewhat off from an intended position on the print media (as reflected in exemplary effective outputs). This may be due to, for example, a misfeed of the print media by the paper guides/rollers. Such shifts may be acceptable if they are within specified limits and do not cause overlap with pre-print text/logo/banner. In particular, if such shifted, printed output is identical to expected print or graphics in rasterized image, then the location shift may be acceptable. In embodiments of the present system and method, algorithms are employed to align text or graphics in rasterized image with corresponding effective printed output of validation image. If the matching algorithms identify such alignable areas of text or graphics, further criteria may be employed to determine if the shifted, effective printed output is still within acceptable print boundaries or print areas.

(iii) Comparison algorithms of the present system and method may also compare subsections or subareas of the validation image with corresponding subareas of rasterized image. If the two images are generally matching, but one or more specific subsections are not matching, further analysis algorithms may be employed. For example, in an embodiment, algorithms may determine if the non-matching areas on the validation image are readable at all as alphanumeric text. For another example, in an alternative or complementary embodiment, algorithms may determine a type of data represented on the non-matching areas. Certain types of data may be flagged by a rule-based system as essential, so that print errors in these areas may result in an assessment of a print-error. Other types of data or graphics may be assessed as being non-essential, so that print errors confined to these areas may still yield an assessment of a successful print operation.

(iv) As an element of image comparison, the present system and method may employ optical character recognition (OCR) to identify different elements of intended print content and effective printed output. Such optical character recognition may aid in the identification and comparison of names, addresses, zip codes, product numbers, and other such text.

Based on the comparison of validation image with raster image, the present system and method makes an evaluation or print operation assessment of whether or not the print operation was valid, or instead had one or more print errors. Evaluation criteria (also referred to as "comparison criteria") may be based on a variety of different print quality criteria.

In an embodiment, evaluation criteria may be expressed in a rule-based system; in an alternative embodiment, evaluation criteria may be based on a one-dimensional or multi-dimensional matrix of criteria with suitable threshold values. In an embodiment, the present system and method may provide a user interface enabling a printer user to activate or deactivate various rules, to fine-tune thresholds for existing rules, or even to add additional logic for new rules.

Exemplary criteria may pertain to, for example and without limitation: (a) a degree or percentage of correspondence between the rasterized image and the validation image; (b) a degree or percentage of correspondence between the selected portions of the rasterized image and the source image; (c) a degree of accuracy in the two-dimensional document placement (in the validation image) of an intended print content of the rasterized image. Other criteria may be employed as well, consistent with the present system and method.

In an embodiment of the present system and method, additional validations may be performed by evaluating the effective printed output. Such validations may include, for example and without limitation: evaluating the legibility of text (alphanumeric output); and evaluating the clarity of bar codes or matrix symbols (for example, by ascertaining whether vertical bars in bar codes are of sufficiently distinct widths to be distinguishable by bar codes readers).

Referring now to FIG. 10, the outcomes of several exemplary comparisons between validation images and a single, source rasterized image 1002 is shown. The exemplary validation images of FIG. 10 are the same as those generated in FIG. 9, and their evaluation represents an extension of the three exemplary print scenarios discussed in conjunction with FIG. 9 above.

A first exemplary validation image 908a illustrates a case where the effective output 907a is substantially identical to the intended print content 1012. It will be seen from FIG. 10 that effective output 907a is also positioned, relative to virtual print media border 1014 (which corresponds to the dimensions of the actual print media) in substantially the intended position on the document. In accordance with criteria in a rule-based system or other evaluation logic, such an output may be assessed as "Valid Print" 1012a.

A second exemplary validation image 908b illustrates a case where the effective output 907b has some significant differences from intended print content 1012. In particular, due to pre-print blemish on the unprinted media, there is an output defect 1010b in the final printed output. The output defect 1010b is indicative of reduced contrast between the last four digits of the zip code and the document background.

It will also be seen from FIG. 10 that effective output 907b has a position shift 1008b to the left, relative to the intended print content 1012. (This may be due, for example, to a misfeed of print media.). In such a case, the print operation assessment 1012b may vary depending on evaluation rules. In some embodiments, the print operation may be deemed as invalid (that is, as a print error) due to either the defect 1010b of the zip code, or due to position shift 1008b, or due to both. In alternative embodiments, the print operation may still be deemed as valid. For example, position shift 1008b may not be considered serious enough to warrant invalidating the print operation, because the shift does not cause the address (or bar code) to overlap with any pre-print text/logo/banner. Further, defect of the zip code may not be considered serious enough to warrant invalidating the print operation, at least because (i) the first five digits of the zip code (which are the more important digits in U.S. postal use) are not part of defect and are of normal contrast; and/or (ii) the zip code may be obtained from the bar code as printed.

A third exemplary validation image 908c illustrates a case where the effective output 907c has some significant differences from intended print content 1012. In particular, the effective printed output 907c has a large upwards and left-wards position shift 1008c, relative to the intended print content 1012. (This may be due, for example, to a misfeed of print media 100.). The position shift is sufficient to cause the new address to overlap with the pre-printed address. This in turn results in print defect 1010c, where the contrast between parts of the addressee address and the return address is zero (as shown by white spots or spaces in defect 1010c).

In such a case, the print assessment may vary depending on evaluation rules. In a typical embodiment, the print operation may be deemed as invalid (that is, as a print error) due to the significant loss of visual content in the alphanumeric symbols of the addressee address. In an alternative embodiment, the print operation may still be deemed as valid. For example, if the entire address can be obtained from the bar code as printed, then defect 1010c may not be counted as a basis for print invalidity. In some embodiments, the present system and method may actually determine that the bar code shown encodes only the zip code, and not the rest of the address. In such a case, defect 1010c may be serious enough to impair routing of the document, and the printed document will likely be deemed invalid, that is, as a "Print Error" 1012c.

C. Improving Print Quality

Figure 11A:
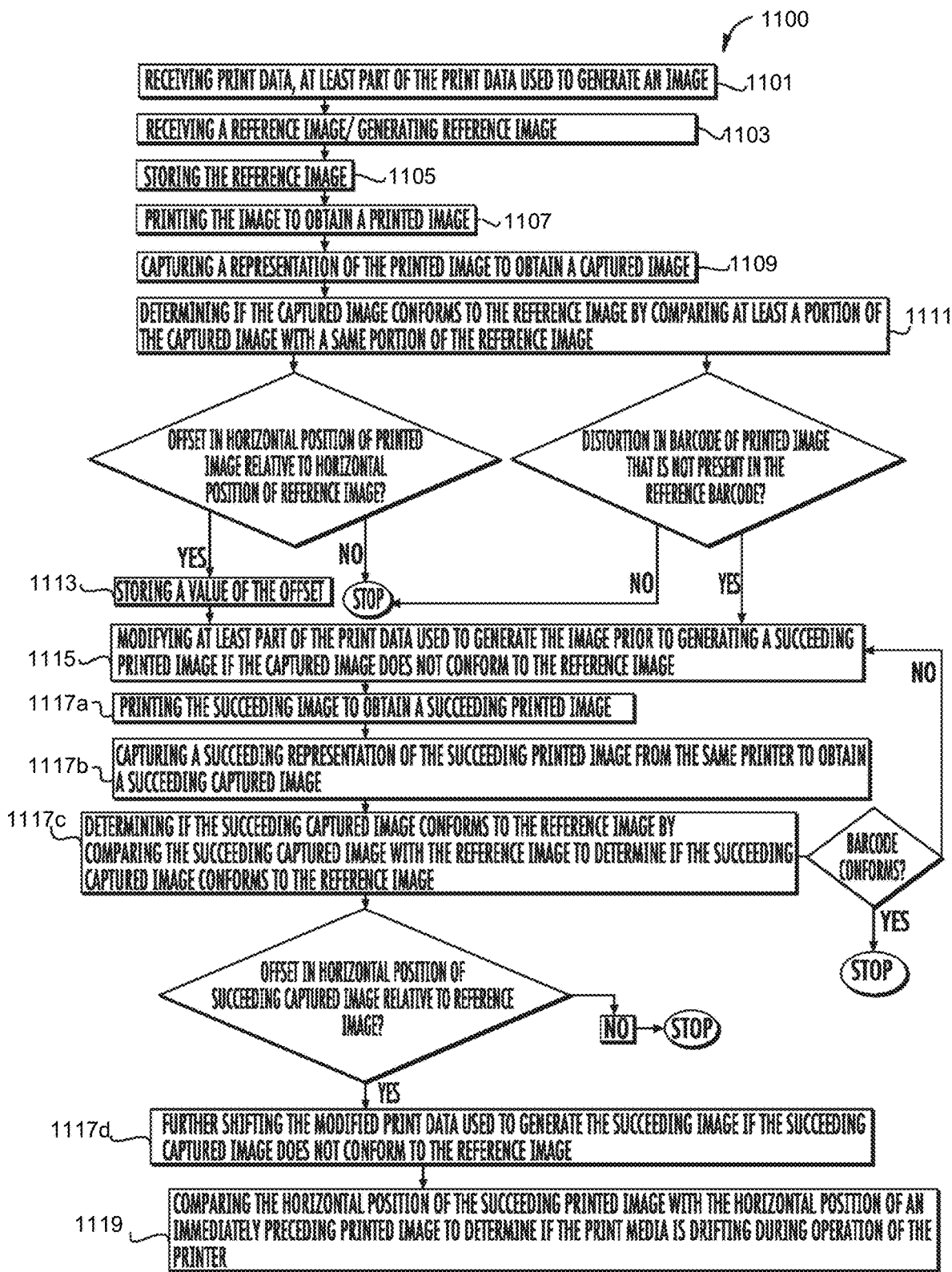
FIGS. 11A and 11B are parts of a flow diagram of methods for printing an image on print media, according to various embodiments of the present invention.
Figure 11B:
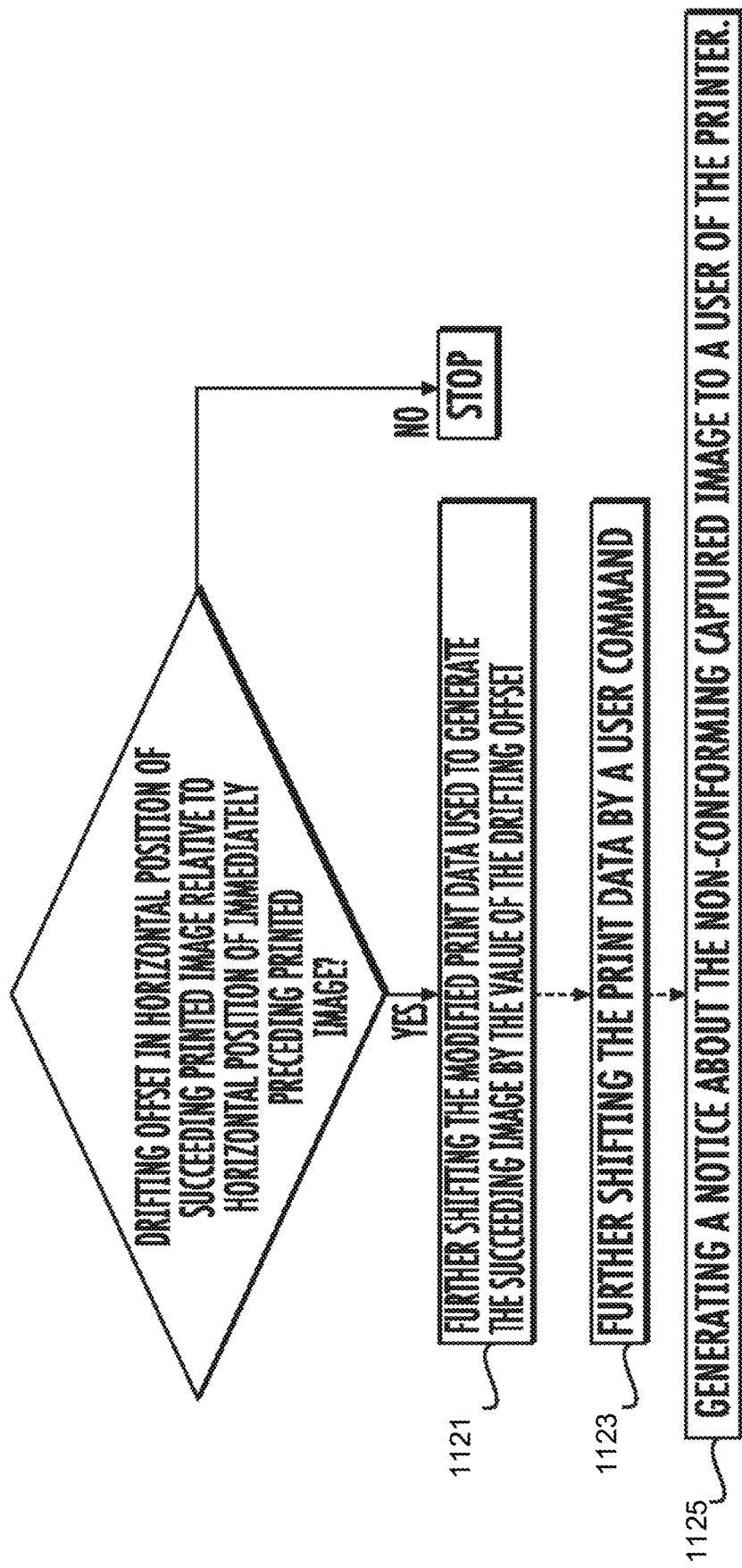

Referring now to FIGS. 11A-11B, according to various embodiments of the present invention, a method 1100 for improving print quality is shown.

As shown in FIG. 11A, the method 1100 comprises receiving print data, at least part of the print data is used to generate the image (step 1101). As described, the image may comprise text, a line, a box, a symbol, a barcode, etc.

Figure 12:
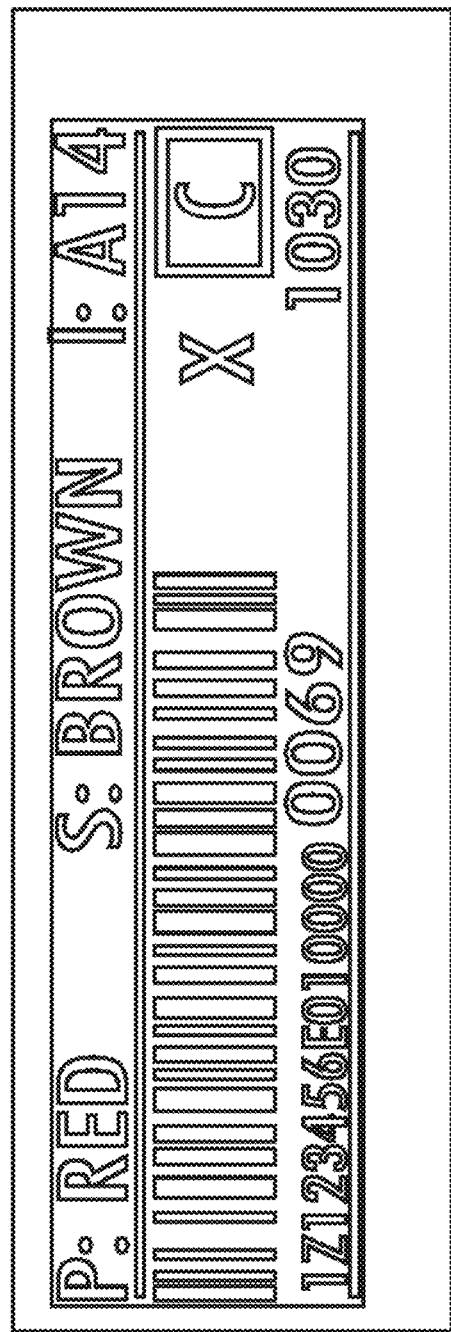
FIG. 12 graphically depicts a reference image configured to be compared with the printed image for horizontal positioning thereof, according to various embodiments of the present invention.

Still referring to FIG. 11A, according to various embodiments of the present invention, the method 1100 continues by receiving a reference image or generating the reference image from at least part of the print data (step 1103). As described above, the reference image could be, for example, the rasterized image of a document that either: (i) was transmitted to the printer electronically from a document source (such as an external computer); or (ii) was generated internally within the printer based on a received page description, again received from a document source. An exemplary reference image is depicted in FIG. 12. The reference image of FIG. 12 is in register on the print media.

Still referring to FIG. 11A, according to various embodiments of the present invention, the method 1100 continues by storing the reference image in the memory of the printer-verifier 200 of FIG. 2B, or memory of the printer 328 and/or verifier memory 314 of verifier 302 of FIG. 3, as described above (step 1105).

Still referring to FIG. 11A, according to various embodiments of the present invention, the method 1100 for printing an image on print media with a printer continues by printing the image to obtain a printed image (step 1107).

Still referring to FIG. 11A, according to various embodiments of the present invention, the method 1100 for printing an image on print media with a printer continues by capturing a representation of the printed image to obtain a captured image (step 1109). The representation may be captured from at least one of a first time use of the printer, a first time use of new print data, and a first time use of new print media stock. For example, The representation is captured in the printer-verifier 200 (more particularly, by the imaging module 236 thereof) as shown in FIG. 2B, in the verifier 302 communicatively coupled to printer 328 in system 300 as shown in FIG. 3, or the pre-scanner 505/post-scanner 510 as shown in FIG. 5. In various embodiments, as noted previously, the captured image may be a barcode.

Still referring to FIG. 11A, according to various embodiments of the present invention, the method 1100 for printing an image on print media with a printer continues by determining if the captured image conforms to the reference image by comparing at least a portion of the captured image with a same portion of the reference image (step 1111).

In various embodiments of the present invention, the captured image is compared with the reference image to determine if a horizontal position of the printed image in the captured image conforms to the horizontal position of the reference image. In various other embodiments as hereinafter described, the captured image is compared with the reference image to determine if there is a distortion in a barcode of the printed image that is not present in the reference barcode.

Turning now to the horizontal position of the printed image relative to the reference image, in various embodiments of the present invention, the captured image is compared with the reference image in memory to determine if a horizontal position of the printed image in the captured image conforms to the horizontal position of the reference image. The captured image comprises a non-conforming captured image if the horizontal position of the printed image in the captured image is offset from the horizontal position of the reference image. In other words, the captured image does not conform to the reference image if there is an offset in the horizontal position of the printed image relative to the horizontal position of the reference image. The offset has a value.

The value of the offset may be stored in the memory of the printer-verifier, in a memory of printer and/or in verifier memory (step 1113). The comparison is made by processor in the printer-verifier 200 of FIG. 2B, in printer 328 or in the verifier 302 of system 300 of FIG. 3. The comparison could also be made by a standalone processor in a communicatively coupled computer.

Still referring to FIG. 11A, according to various embodiments of the present invention, the method 1100 continues by modifying at least part of the print data used to generate the image prior to generating a succeeding image if the captured image does not conform to the reference image (step 1115). Modifying at least part of the print data is performed in printer-verifier or printer (where the offset value is entered into the printer).

In various embodiments of the present invention, modifying the print data used to generate the image results in modified print data and comprises shifting the print data used to generate the image by the value of the offset to reposition the succeeding printed image on the print media. Shifting the print data used to generate the image comprises inserting or removing a margin in a left or right portion of the print data used to generate the image. For example, if the horizontal position of the printed image in the captured image is offset from the horizontal position of the reference image, the print data used to generate the image may be shifted by the value of the offset to reposition the succeeding image on the print media.

Figure 13A:
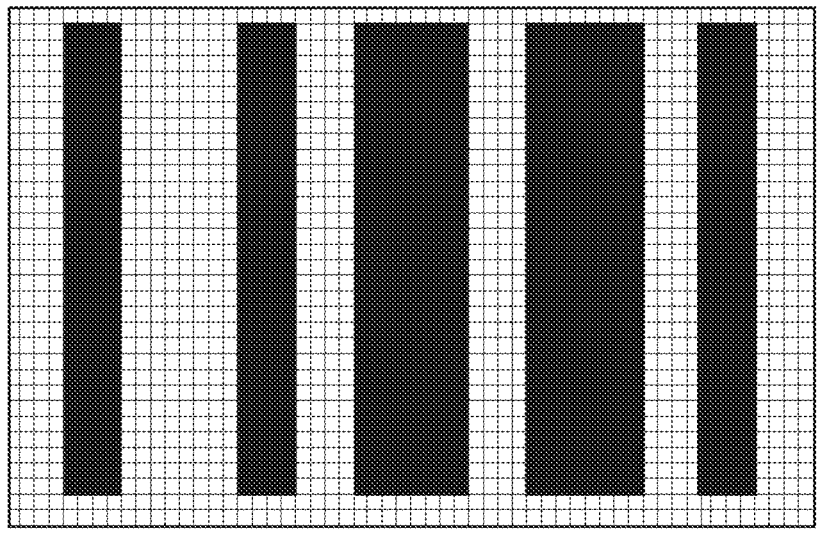
FIG. 13A graphically depicts another reference image with narrow bar and narrow space, according to various embodiments of the present invention.
Figure 13B:
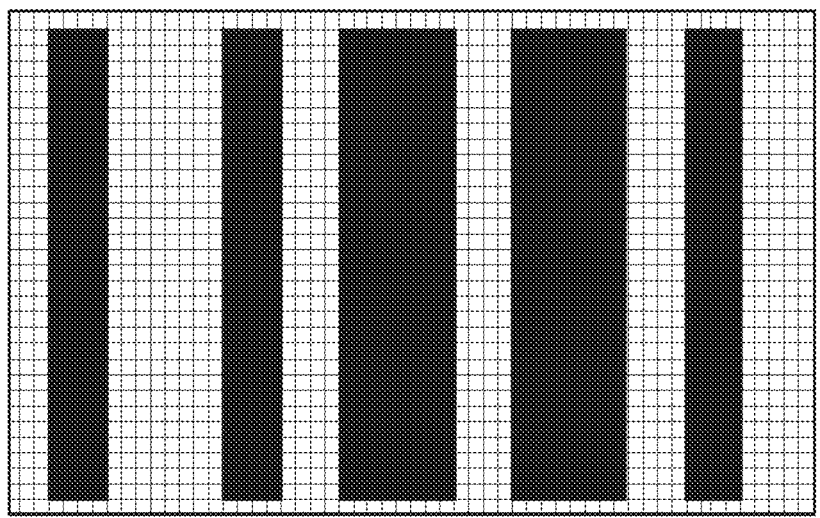
FIG. 13B graphically depicts modifying at least part of the print data of FIG. 13A prior to generating a succeeding image, according to various embodiments of the present invention.

Referring now to FIGS. 13A and 13B, according to various embodiments of the present invention, shifting the print data by the value of an exemplary offset (an exemplary one square) is depicted. FIG. 13A depicts an exemplary reference image. The reference image is a graphical representation of a string of binary bytes in memory, similar to a bitmap. Each grid square in FIG. 13A represents a command to a single thermal printhead resistive element (sometimes called a "printhead dot"). When the grid square is filled (black), it represents a command to energize, i.e., turn on the printhead dot for a small amount of time, causing a visible image to form on the print media. A column of grid squares on the right edge of each bar in FIG. 13A has been removed (changed from black to white) in FIG. 13B. A column of grid squares on the left edge of each bar of FIG. 13A has also been added (changed from white to black) in FIG. 13B. The image data in FIG. 13B maintains from FIG. 13A the four grid squares for each narrow element width. The net effect is that the succeeding captured image will be shifted to the left for proper horizontal positioning on subsequent print media.

While horizontal re-positioning of a barcode has been described, any succeeding captured image may be repositioned in such a manner according to various embodiments of the present invention. It is also to be understood that the offset value may be greater than one square.

In various embodiments of the present invention, shifting the print data used to generate the image may be done prior to a first time use of the new print media stock. A width of the new print media stock may be captured and the print data shifted based on the width to substantially center the succeeding image on the print medium.

Referring back to FIG. 11A, according to various embodiments of the present invention, the method 1100 may continue, after shifting the print data used to generate the image, by: printing the succeeding image to obtain a succeeding printed image (step 1117a); capturing a succeeding representation of the succeeding printed image from the same printer to obtain a succeeding captured image (step 1117b); determining if the succeeding captured image conforms to the reference image by comparing the succeeding captured image with the reference image (step 1117c); and further shifting the modified print data used to generate the succeeding image if the succeeding captured image does not conform to the reference image (step 1117d), wherein the succeeding captured image does not conform to the reference image if there is an offset in the horizontal position of the succeeding printed image in the succeeding captured image relative to the horizontal position of the reference image (YES to "Offset in Horizontal Position of succeeding captured image relative to reference image?"). The printing, capturing, comparing, and further shifting steps are repeated until the succeeding printed image in the succeeding captured image conforms to the reference image.

In various embodiments of the present invention, the horizontal position of the succeeding printed image may be compared with the horizontal position of an immediately preceding printed image to determine if the print media is drifting during operation of the printer (step 1119). A difference in the horizontal position of the succeeding printed image relative to the horizontal position of the immediately preceding printed image comprises a drifting offset having a value. The drifting offset may be stored in a memory.

Referring now to FIG. 11B, the modified print data used to generate the succeeding image may be further shifted by the value of the drifting offset resulting in further modified print data before generating a next succeeding image using the further modified print data (step 1121). There can also be a drifting offset threshold, after which the further shifting is implemented. The print data may additionally be further shifted by changing a user command (step 1123), in accordance with various embodiments of the present invention.

Returning to FIG. 11B, according to various embodiments of the present invention, the method for printing an image on print media with a printer may continue by generating a notice about the non-conforming captured image to a user of the printer if the captured image does not conform to the reference image (step 1125). The user may be prompted by the notice to adjust the print media guide of the printer.

As noted previously, in various embodiments, step 1111 comprises determining if the captured image conforms to the reference image by comparing at least a portion of the captured image with a same portion of the reference image. However, rather than comparing horizontal position, the inquiry is whether there is a distortion in the printed barcode that is not present in the reference image. The printed barcode does not conform to the reference barcode if a distortion exists in the printed barcode that is not present in the reference barcode.

As noted previously, the thermal printhead may be set to a high temperature in order to obtain better graphics. High printhead temperatures are often used to obtain bolder or more vivid graphics. However, if the printhead temperature is too high, the barcode printed using that thermal printhead may include a distortion. The distortion may cause the printed barcode to be out of specification.

Figure 15A:
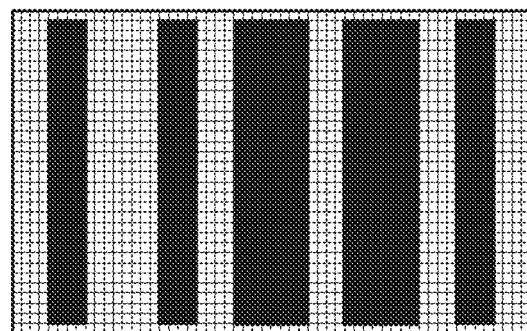
FIG. 15A graphically depicts a reference image for a one-dimensional printed barcode with narrow bar and narrow space, according to various embodiments of the present invention.
Figure 15B:
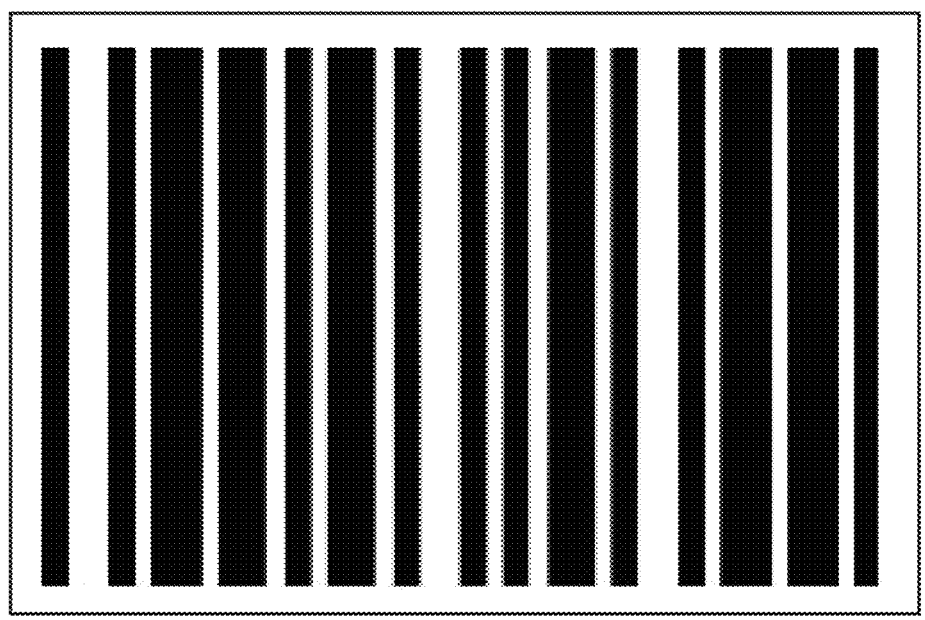
FIG. 15B graphically depicts the printed barcode generated from the reference image of FIG. 15A, according to various embodiments of the present invention.

Referring now to FIGS. 15A-15D, FIG. 15A illustrates an exemplary reference image for a printed barcode. In FIG. 15A, the narrow bars and narrow spaces of the reference image are both an exemplary four grid squares wide. FIG. 15B illustrates a printed barcode generated from the reference image (more particularly, the image data thereof). The printed barcode of FIG. 15B includes a distortion (the width of the narrow bars of FIG. 15A is substantially wider than the width of the narrow spaces) such that the printed barcode is out of specification (failing Modulation grade because the bars are too wide) as a result of an elevated thermal printhead temperature. More particularly, the width of the narrow bars is substantially wider than the width of the narrow spaces.

If a distortion is present (such as in the printed barcode of FIG. 15B), method 1100 proceeds to step 1115 as depicted in FIG. 11A. The print data used to generate the barcode is modified in step 1115 prior to generating a succeeding barcode if the printed barcode in the captured image does not conform to the reference barcode. Modifying at least part of the print data used to generate the barcode comprises at least one of removing a portion of and/or adding to each bar edge of the barcode in the print data used to generate the image, thereby maintaining overall dimensions in the printed barcode of the succeeding image.

Figure 15C:
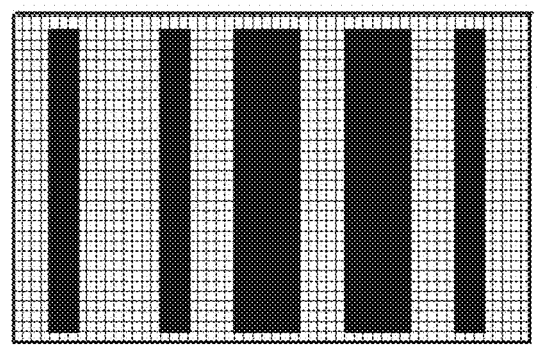
FIG. 15C graphically depicts modifying at least part of the print data used to generate the printed barcode of FIG. 15B prior to generating a succeeding image, according to various embodiments of the present invention.

FIG. 15C illustrates modifying at least part of the image data of the reference image of FIG. 15A as the captured image does not conform to the reference barcode. In FIG. 15C, a column of grid squares on the right side of each bar has been removed (changed from black to white), resulting in narrow bars that are now three grid squares wide and wide bars and spaces that are five grid squares wide.

Figure 15D:
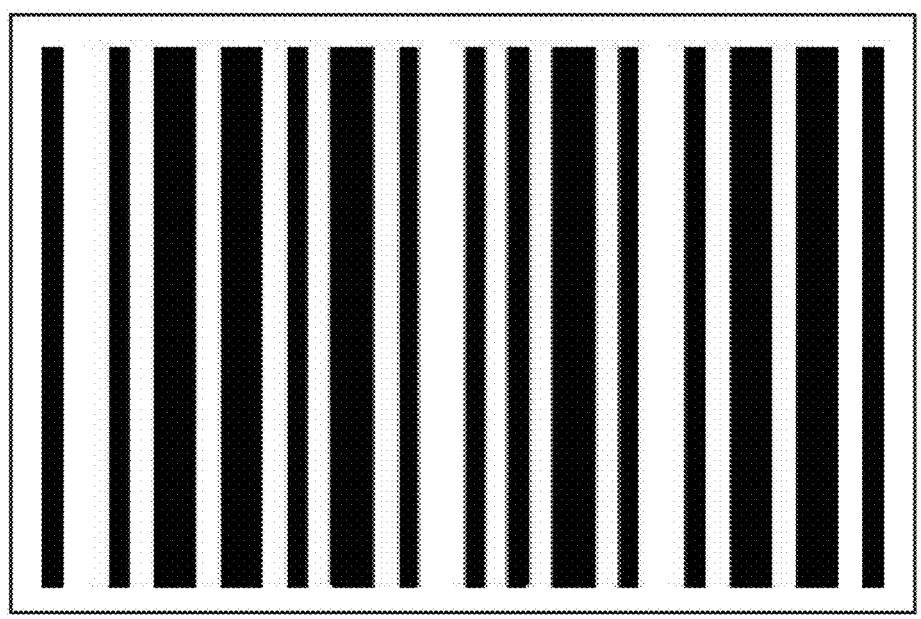
FIG. 15D graphically depicts the succeeding printed barcode generated from the modified print data depicted in FIG. 15C, according to various embodiments of the present invention.

FIG. 15D illustrates a succeeding (captured) barcode generated from the modified image data of FIG. 15C. The removal of the column of grid squares (modification of image data) from every bar in FIG. 15C compensates for the elevated printhead temperature and results in the succeeding captured barcode (FIG. 15D) having nearly equal width narrow bars and narrow spaces. The succeeding captured barcode of FIG. 15D does not include the distortion of FIG. 15B, and should receive an "A" modulation grade. The succeeding captured barcode of FIG. 15D printed according to various embodiments compensates for the excessive thermal printhead temperature without affecting the extra-dark graphics intended by the printer user (i.e., the better graphics are retained in the succeeding captured barcode).

Figure 14:
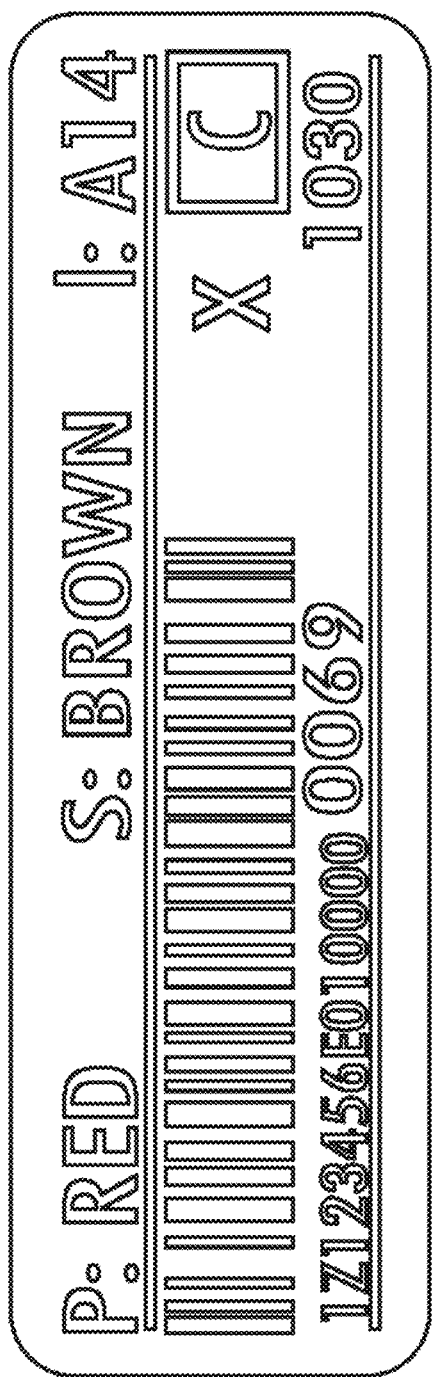
FIG. 14 graphically depicts an automatic barcode adjustment, according to various embodiments of the present invention.
Figure 16A:
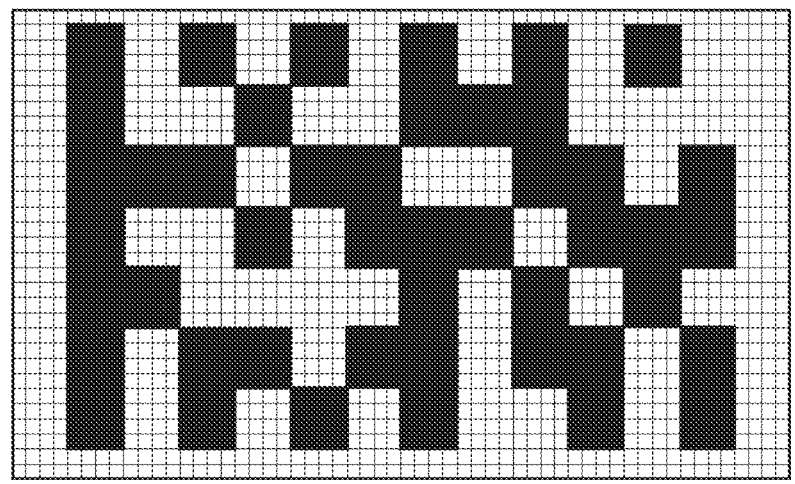
FIG. 16A graphically depicts a reference image for a two-dimensional printed barcode, according to various embodiments of the present invention.
Figure 16B:
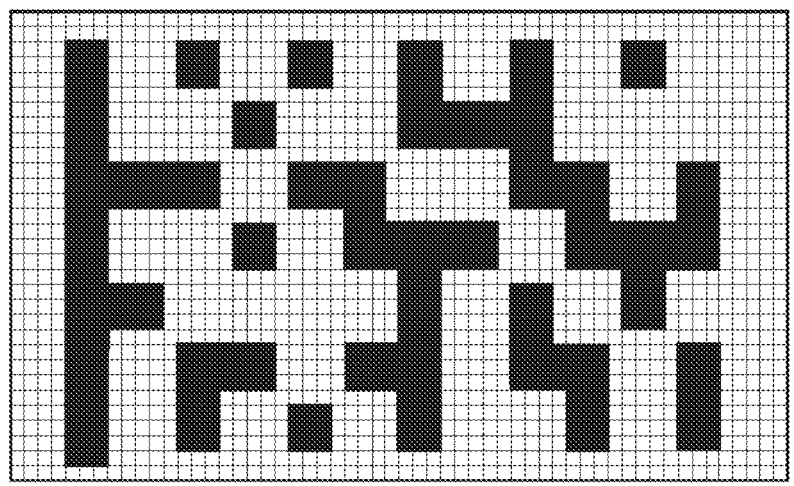
FIG. 16B graphically depicts modifying at least part of the print data used to generate the two-dimensional printed barcode of FIG. 16A, according to various embodiments of the present invention.

FIG. 14 also graphically depicts an automatic barcode adjustment, according to various embodiments of the present invention;

FIGS. 16A and 16B depict printing a two-dimensional image on print media with a printer, according to various embodiments of the present invention. FIG. 16A illustrates a reference image for printing the two-dimensional image on print media. The reference image is a segment of a Data Matrix two-dimensional barcode in which every element is an exemplary 4 by 4 squares in size, i.e., the same X-dimension as the one-dimensional example depicted in FIGS. 15A through 15D. For the two-dimensional barcode, compensating for the excessive thermal printhead temperature requires modification of the image data in both the horizontal and vertical edges of the elements.

FIG. 16B depicts the removal of one square (one column) from the right vertical edge of each element and one square (one row) from the bottom horizontal edge of each element in FIG. 16A, resulting in standalone black elements of 3 by 3 squares in size and standalone white elements of 5 by 5 squares in size, both of which were formerly 4 by 4 squares in size. Importantly, only the edges are adjusted, thereby maintaining the overall dimensions in the printed barcode of the succeeding image. In other words, if two elements are adjoining, the boundary between them is not adjusted. When the succeeding barcode is printed from the modified image data, the black elements and the white elements of the succeeding barcode will be consistently sized (i.e., no distortion will be present in the succeeding barcode), despite the excessive thermal printhead temperature.

It is to be understood that the square(s) can alternatively be added, that the square(s) can be added or removed to other edges (e.g., the left edge, the top edge, etc.) as long as the modification is consistently applied.

From the foregoing, it is to be appreciated that various embodiments enable correct horizontal positioning of a printed image on a print medium. Various embodiments enable correct horizontal positioning of a printed image on a print medium and enable placing the printing properly with regard to the edges of the print medium such that the printing is reliably and consistently in register. Various embodiments enable the printing of barcodes without distortions.

IV. Additional Implementation Details

In the specification and figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined to provide further embodiments. These and other changes can be made to the present systems and methods in light of the above-detailed description. Accordingly, the invention is not limited by the disclosure, but instead its scope is to be determined by the following claims.

V. Incorporation by Reference

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;

U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;

U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

The invention claimed is:

1. A method for printing an image on print media with a printer, the method comprising:
receiving at least part of print data used to generate the image;
receiving a reference image or generating the reference image from at least part of the print data;
storing the reference image in a memory of the printer;
printing the image to obtain a printed image;
capturing a representation of the printed image to obtain a captured image;
determining, by a processor, if the captured image conforms to the reference image by comparing a horizontal position of the printed image of the captured image with a horizontal position of the reference image; and
modifying, by the processor, at least part of the print data used to generate the image prior to generating a succeeding image when the captured image does not conform to the reference image due to an offset in the horizontal position of the printed image relative to the horizontal position of the reference image, wherein modifying at least part of the print data comprises shifting at least part of the print data by a value of an offset to reposition the succeeding image on the print media.

2. The method according to claim 1, wherein the captured image comprises a barcode and determining, by the processor, if the captured image conforms to the reference image comprises comparing the barcode of the captured image with a reference barcode in the reference image, wherein the captured image does not conform to the reference image if the barcode of the captured image includes a distortion not present in the reference barcode.

3. The method according to claim 2, wherein modifying, by the processor, at least part of the print data comprises automatically adjusting the barcode in the print data used to generate the image for improving a print quality of the succeeding image comprising a printed barcode.

4. The method according to claim 3, wherein automatically adjusting, by the processor, the barcode comprises at least one of removing a portion of and adding to each bar edge of the barcode in the print data used to generate the image, thereby maintaining overall dimensions in the printed barcode of the succeeding image.

5. The method according to claim 1, further comprising: prior to the modifying step, storing the value of the offset in the memory; and wherein modifying, by the processor, at least part of the print data used to generate the image results in modified print data.

6. The method according to claim 1, wherein shifting at least part of the print data used to generate the image comprises inserting or removing a margin in a left or right portion of at least part of the print data used to generate the image.

7. The method according to claim 6, further comprising, after shifting at least part of the print data used to generate the image:
printing the succeeding image to obtain a succeeding printed image;
capturing, by the processor, a succeeding representation of the succeeding printed image from the same printer to obtain a succeeding captured image;
comparing, by the processor, the succeeding captured image with the reference image to determine if the succeeding captured image conforms to the reference image; and
further shifting the modified print data used to generate the succeeding image if the succeeding captured image does not conform to the reference image, wherein the succeeding captured image does not conform to the reference image if there is an offset in an horizontal position of the succeeding printed image in the succeeding captured image relative to an horizontal position of the reference image.

8. The method according to claim 7, wherein the printing, capturing, comparing, and further shifting steps are repeated until the succeeding printed image in the succeeding captured image conforms to the reference image.

9. The method according to claim 7, further comprising: comparing, by the processor, the horizontal position of the succeeding printed image with the horizontal position of an immediately preceding printed image to determine if the print media is drifting during operation of the printer, wherein a difference in the horizontal position of the succeeding printed image relative to the horizontal position of the immediately preceding printed image comprises a drifting offset having a value; and further shifting, by the processor, the modified print data used to generate the succeeding image by the value of the drifting offset resulting in further modified print data before generating a next succeeding image using the further modified print data.

10. The method according to claim 1, further comprising further shifting the print data by changing a user command.

11. The method according to claim 1, wherein capturing the representation of the printed image comprises capturing the representation from at least one of:
a first time use of the printer;
a first time use of new print data; and
a first time use of new print media stock.

12. The method according to claim 11, further comprising, prior to the first time use of the new print media stock, capturing a width of the new print media stock and shifting the print data based on the width to substantially center the succeeding image on a print medium.

13. The method according to claim 1, wherein the captured image comprises a non-conforming captured image if the captured image does not conform to the reference image, the method further comprising:
generating a notice about the non-conforming captured image to a user of the printer.

14. The method according to claim 13, wherein generating the notice comprises prompting the user to adjust a print media guide of the printer.

15. A method for printing an image on print media, the method comprising:
receiving at least part of print data used to generate the image;
receiving a reference image or generating the reference image from at least part of the print data;
storing the reference image in a memory of a printer;
printing the image to obtain a printed image;
capturing a representation of the printed image to obtain a captured image;
comparing, by a processor, the captured image with the reference image to determine if a horizontal position of the printed image conforms to a horizontal position of the reference image, wherein the captured image comprises a non-conforming captured image if the horizontal position of the printed image in the captured image is offset from the horizontal position of the reference image, the offset having a value;
storing the value of the offset in the memory of the printer; and
shifting, by the processor, at least part of the print data used to generate the image by the value of the offset to reposition a succeeding image on the print media.

16. The method according to claim 15, wherein the image comprises a printed indicium.

17. The method according to claim 15, wherein shifting at least part of the print data used to generate the image comprises inserting or removing a margin in a left or right portion of the print data used to generate the image.

18. A method for improving print quality during operation of a printer, the method comprising:
printing a barcode on a print medium to obtain a printed barcode, the barcode generated using print data;
capturing an image of the printed barcode to obtain a captured image;
determining, by a processor, if the printed barcode in the captured image conforms to a reference barcode of a reference image by comparing a horizontal position of the printed barcode in the captured image with a horizontal position of the reference barcode, wherein the printed barcode does not conform with the reference barcode if a distortion exists in the printed barcode that is not present in the reference barcode, the distortion being due to an offset in the horizontal position of the printed barcode relative to the horizontal position of the reference barcode; and
modifying, by the processor, the print data used to generate the barcode prior to generating a succeeding barcode if the printed barcode in the captured image does not conform to the reference barcode.

19. The method according to claim 18, wherein modifying the print data used to generate the barcode comprises at least one of removing a portion of and adding to each bar edge of the barcode in the print data used to generate the barcode, thereby maintaining overall dimensions in the succeeding barcode.

* * * * *